United States Patent
Qiu et al.

(10) Patent No.: US 11,256,384 B2
(45) Date of Patent: Feb. 22, 2022

(54) METHOD, APPARATUS AND DEVICE FOR VIEW SWITCHING OF VIRTUAL ENVIRONMENT, AND STORAGE MEDIUM

(71) Applicant: TENCENT TECHNOLOGY (SHENZHEN) COMPANY LIMITED, Guangdong (CN)

(72) Inventors: Meng Qiu, Guangdong (CN); Junming Wang, Guangdong (CN); Jiaqi Pan, Guangdong (CN); Ya Zhang, Guangdong (CN); Shuting Zhang, Guangdong (CN); Qinghua Xiao, Guangdong (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 0 days.

(21) Appl. No.: 16/886,111

(22) Filed: May 28, 2020

(65) Prior Publication Data
US 2020/0333941 A1 Oct. 22, 2020

Related U.S. Application Data

(63) Continuation of application No. PCT/CN2018/106552, filed on Sep. 19, 2018.

(30) Foreign Application Priority Data

Feb. 9, 2018 (CN) .......................... 201810135907.7

(51) Int. Cl.
*G06F 3/0481* (2013.01)
*A63F 13/2145* (2014.01)
(Continued)

(52) U.S. Cl.
CPC ...... *G06F 3/04815* (2013.01); *A63F 13/2145* (2014.09); *A63F 13/42* (2014.09);
(Continued)

(58) Field of Classification Search
CPC ............. G06F 3/04815; G06F 3/04847; G06F 3/04855; G06T 19/003; A63F 13/42;
(Continued)

(56) References Cited

U.S. PATENT DOCUMENTS

| | | | |
|---|---|---|---|
| 5,835,692 A * | 11/1998 | Cragun | ................... G06T 19/20 345/419 |
| 10,558,353 B2 * | 2/2020 | Dickerson | .......... H04N 21/4312 |

(Continued)

FOREIGN PATENT DOCUMENTS

| | | |
|---|---|---|
| CN | 102473322 A | 5/2012 |
| CN | 103793060 A | 5/2014 |

(Continued)

OTHER PUBLICATIONS

"Horizontal Compass HUD?", Jan. 2016, Unity 3D Forums, https://forum.unity.com/threads/horizontal-compass-hud.381000/ (Year: 2016).*

(Continued)

*Primary Examiner* — Justin R. Blaufeld
(74) *Attorney, Agent, or Firm* — Sughrue Mion, PLLC

(57) ABSTRACT

A viewing angle switching method is provided. The viewing angle switching method includes: displaying a first user interface, the first user interface including an environment picture and a viewing angle switching region, the environment picture including a three-dimensional virtual environment observed from a first viewing angle direction by a virtual object, and the viewing angle switching region including a viewing angle jumping element used for viewing angle jumping; receiving a viewing angle jumping signal
(Continued)

triggered on a target viewing angle jumping element, the at least one viewing angle jumping element including the target viewing angle jumping element; determining a second viewing angle direction corresponding to the target viewing angle jumping element; and displaying a second user interface, the second user interface including the environment picture of the three-dimensional virtual environment observed from the second viewing angle direction by the virtual object.

17 Claims, 17 Drawing Sheets

(51) Int. Cl.
  *A63F 13/42* (2014.01)
  *A63F 13/525* (2014.01)
  *A63F 13/5255* (2014.01)
  *A63F 13/837* (2014.01)
  *A63F 13/92* (2014.01)
  *G06T 19/00* (2011.01)
  *G06F 3/04815* (2022.01)
  *G06F 3/0484* (2013.01)
  *G06F 3/0485* (2013.01)
  *G06F 3/04847* (2022.01)
  *G06F 3/04855* (2022.01)

(52) U.S. Cl.
  CPC ........ *A63F 13/525* (2014.09); *A63F 13/5255* (2014.09); *A63F 13/837* (2014.09); *A63F 13/92* (2014.09); *G06T 19/003* (2013.01); *G06F 3/04847* (2013.01); *G06F 3/04855* (2013.01)

(58) Field of Classification Search
  CPC .... A63F 13/2145; A63F 13/525; A63F 13/92; A63F 13/837; A63F 13/5255
  See application file for complete search history.

(56) References Cited

U.S. PATENT DOCUMENTS

| | | | | |
|---|---|---|---|---|
| 2011/0285704 | A1* | 11/2011 | Takeda | G06T 15/00 345/419 |
| 2013/0073988 | A1* | 3/2013 | Groten | G01C 21/3679 715/753 |
| 2014/0078144 | A1* | 3/2014 | Berriman | G06F 3/04817 345/426 |
| 2017/0139578 | A1* | 5/2017 | Dickerson | G06F 3/04815 |
| 2018/0052595 | A1* | 2/2018 | Parmar | G06F 3/04815 |
| 2019/0004506 | A1* | 1/2019 | Ochs | G05B 19/0423 |
| 2019/0060745 | A1* | 2/2019 | He | A63F 13/52 |
| 2019/0099665 | A1* | 4/2019 | Miao | A63F 13/837 |
| 2019/0111342 | A1* | 4/2019 | Miao | A63F 13/5372 |
| 2019/0317657 | A1* | 10/2019 | Oddy | H04N 21/21805 |
| 2020/0125244 | A1* | 4/2020 | Feinstein | G06F 3/04883 |

FOREIGN PATENT DOCUMENTS

| | | | |
|---|---|---|---|
| CN | 106445118 A | 2/2017 | |
| CN | 106774893 A | 5/2017 | |
| CN | 107132981 A | 9/2017 | |
| CN | 107648847 A | 2/2018 | |
| CN | 108376424 A | 8/2018 | |
| WO | 00/20987 A2 | 4/2000 | |
| WO | WO-0188687 A2 * | 11/2001 | ........... G06F 1/1626 |

OTHER PUBLICATIONS

Unity Horizontal Compass, Mar. 4, 2018, GitHub, https://github.com/PopThosePringles/Unity-Horizontal-Compass (Year: 2018).*

Horizontal compass, Apr. 27, 2020, PlayCanvas Forums, https://forum.playcanvas.com/t/horizontal-compass/12858 (Year: 2020).*

Circular vs Linear Compass, Dec. 6, 2013, YouTube, https://www.youtube.com/watch?v=XPTboqggOdw (Year: 2013).*

International Search Repot for PCT/CN2018/106552 dated Dec. 26, 2018 (PCT/ISA/210).

Communication dated Feb. 3, 2021 from The State Intellectual Property Office of People's Republic of China in Application No. 201810135907.7.

Liu Qingsong, "3D Visualization Application Based on Android System", Full-text Database of Chinese Excellent Masterchar(39)s Degree Thesis-Infomiation Technology Series, No. 01, Jan. 15, 2014, pp. 15-17 (3 pages).

How to eat chicken introduction free switch visual angle, entertainment Television Synopsis, http://www.iqiyi.com/w_19rwlkpmch.html, videos 3 char(39)41 and 4char(39) 08): at 3 minutes 41 seconds, Open Date: Jan. 7, 2018.

Written Opinion of the International Searching Authority dated Dec. 26, 2018 in International Application No. PCT/CN2018/106552.

Extended European Search Report dated Dec. 10, 2021 in European Application No. 18904652.7.

* cited by examiner

METHOD, APPARATUS AND DEVICE FOR VIEW SWITCHING OF VIRTUAL ENVIRONMENT, AND STORAGE MEDIUM

CROSS-REFERENCE TO RELATED APPLICATIONS

This application is a continuation of International Patent Application No. PCT/CN2018/106552, which claims priority from Chinese Patent Application No. 201810135907.7, filed with the China National Intellectual Property Administration (CNIPA) on Feb. 9, 2018, the disclosures of which are incorporated herein by reference in their entireties.

BACKGROUND

1. Field

Methods and apparatuses consistent with embodiments of the present application relate to human-computer interaction, and in particular, to a viewing angle switching method and apparatus for a three-dimensional virtual environment, a device, and a storage medium.

2. Related Art

Terminals such as a smartphone and a tablet computer are provided with many application programs including a three-dimensional virtual environment, such as a virtual reality application program, a three-dimensional map application program, a military simulation application program, a first-person shooting (FPS) game, and a multiplayer online battle arena (MOBA) game.

In the related art, a terminal displays an environment picture in a virtual environment by using a first-person viewing angle of a virtual character. Using an FPS game in a smartphone as an example, a left joystick and a right sliding screen are displayed on a user interface of the FPS game, and a user may change a location of the virtual character in the three-dimensional virtual environment by using the left joystick and change a viewing angle direction of the virtual character in the three-dimensional virtual environment by using the right sliding screen. For example, the user slides to the left by using a right finger, and the viewing angle direction of the virtual character in the three-dimensional virtual environment turns to the left side.

Because an operation region for the right sliding screen is limited, when the user performs viewing angle switching with a relatively large range, multiple sliding operations are required on the right sliding screen to complete the viewing angle switching, and the efficiency of human-computer interaction is relatively low.

SUMMARY

One or more embodiments provide a viewing angle switching method and apparatus for a virtual environment, a device, and a storage medium, which can resolve the problem in the related art that when a user performs viewing angle switching with a relatively large range, a plurality of times of sliding operations are required on the right sliding screen to complete the viewing angle switching, and the switching speed of the viewing angle is relatively slow.

According to an aspect of an embodiment, there is provided a viewing angle switching method, performed by at least one processor, for a virtual environment, the viewing angle switching method including: displaying, by the at least one processor, a first user interface, the first user interface including an environment picture and a viewing angle switching region, the environment picture including a three-dimensional virtual environment observed from a first viewing angle direction by a virtual object, and the viewing angle switching region including at least one viewing angle jumping element used for viewing angle jumping; receiving, by the at least one processor, a viewing angle jumping signal triggered on a target viewing angle jumping element, the at least one viewing angle jumping element including the target viewing angle jumping element; determining, by the at least one processor, a second viewing angle direction corresponding to the target viewing angle jumping element; and displaying, by the at least one processor, a second user interface, the second user interface including the environment picture of the three-dimensional virtual environment observed from the second viewing angle direction by the virtual object.

According to an aspect of an embodiment, there is provided a viewing angle switching apparatus, configured to perform viewing angle switching on a virtual environment, the viewing angle switching apparatus including: at least one memory configured to store computer program code; and at least one processor configured to access the at least one memory and operate as instructed by the computer program code, the computer program code including: display code configured to cause the at least one processor to display a first user interface, the first user interface including an environment picture and a viewing angle switching region, the environment picture including the virtual environment observed from a first viewing angle direction by a virtual object, and the viewing angle switching region including at least one viewing angle jumping element used for performing viewing angle jumping; receiving code configured to cause the at least one processor to receive a viewing angle jumping signal triggered on a target viewing angle jumping element, the at least one viewing angle jumping element including the target viewing angle jumping element; and processing code configured to cause the at least one processor to determine a second viewing angle direction corresponding to the target viewing angle jumping element. The display code is further configured to cause the at least one processor to display a second user interface, the second user interface including the environment picture of the virtual environment observed from the second viewing angle direction by the virtual object.

According to an aspect of an embodiment, there is provided one or more non-transitory computer-readable storage mediums storing computer readable instructions, the computer readable instructions, when executed by one or more processors, cause the one or more processors to: display a first user interface, the first user interface including an environment picture and a viewing angle switching region, the environment picture including a three-dimensional virtual environment observed from a first viewing angle direction by a virtual object, and the viewing angle switching region including at least one viewing angle jumping element used for viewing angle jumping; receive a viewing angle jumping signal triggered on a target viewing angle jumping element, the at least one viewing angle jumping element including the target viewing angle jumping element; determine a second viewing angle direction corresponding to the target viewing angle jumping element; and display a second user interface, the second user interface including the environment picture of the three-dimensional virtual environment observed from the second viewing angle direction by the virtual object.

By receiving the viewing angle jumping signal triggered on the target viewing angle jumping element in the viewing angle switching region, and displaying the second user interface according to the second viewing angle direction corresponding to the target viewing angle jumping element, one or more embodiments resolve the problem of low efficiency of human-computer interaction when a viewing angle direction of a virtual object is changed by using a right sliding screen in the related art. Because the viewing angle direction of the virtual object is changed by tapping the target viewing angle jumping element instead of using the right sliding screen, the switching speed of the viewing angle is increased, so as to improve the efficiency of the human-computer when the user changes the viewing angle direction with a large range.

BRIEF DESCRIPTION OF THE DRAWINGS

The above and other aspects, features and advantages will become apparent from the following detailed description taken in conjunction with the accompanying drawings in which.

DETAILED DESCRIPTION

Figure 1:
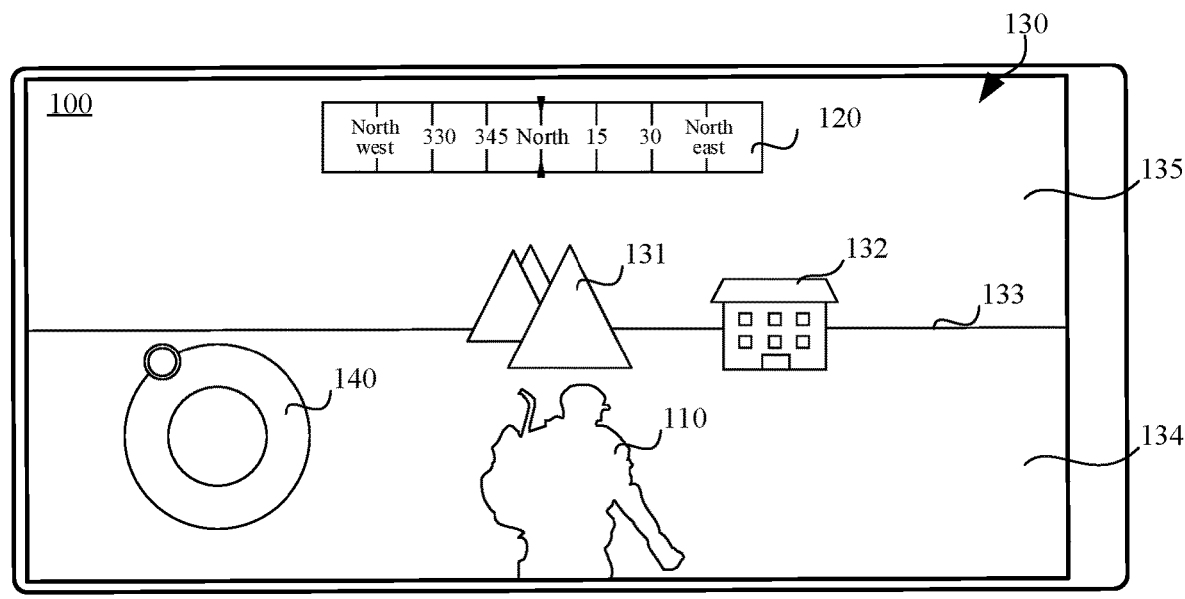
FIG. 1 is a schematic diagram of a display interface of a three-dimensional virtual environment according to an exemplary embodiment.

To better convey the present disclosure, exemplary embodiments will be further described with reference to the accompanying drawings. It should be understood that the specific exemplary embodiments described herein are merely used to explain this application but are not intended to limit this application.

First, several terms involved in the embodiments are explained.

Virtual environment: a virtual environment displayed (or provided) by an application program when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a three-dimensional virtual environment, and description is made by using an example in which the virtual environment is a three-dimensional virtual environment in the following embodiment, but this is not limited. Optionally, the virtual environment is further used for a virtual environment battle between at least two virtual roles. Optionally, the virtual environment is further used for a battle between at least two virtual roles by using virtual guns. Optionally, the virtual environment is further used for a battle between at least two virtual roles by using virtual guns in a range of a target region, and the range of the target region may be continuously decreased as time goes by in the virtual environment. In the embodiments, description is made by using an example in which the virtual environment is a three-dimensional virtual environment.

Virtual object: a virtual object is a movable object in a three-dimensional virtual environment. The movable object may be a virtual character, a virtual animal, a cartoon character, and the like, for example, a character, an animal, a plant, an oil drum, a wall, a stone, and the like displayed in a three-dimensional virtual environment. Optionally, the virtual object is a three-dimensional model created based on a skeletal animation technology. Each virtual object has a shape and a volume in the three-dimensional virtual environment, and occupies some space in the three-dimensional virtual environment. Generally, one virtual object includes one central point. When the virtual object is a regular object, the central point is a geometric center of the virtual object; and when the virtual object is an irregular object, the central point may be preset according to a motion state of the virtual object.

Viewing angle direction: an observation direction during observation from a first-person viewing angle or a third-person viewing angle of a virtual object in a three-dimensional virtual environment.

World coordinate system: a three-dimensional coordinate system established for a three-dimensional virtual environment, the world coordinate system is used for measuring parameters such as coordinates, a direction vector, a motion vector of a virtual object in a three-dimensional virtual environment, and generally, the world coordinate system includes three coordinate axes: an x axis, a y axis, and a z axis. Optionally, a plane on which the x axis and the z axis are located is a horizontal plane, that is, a reference plane, and an upper half axis of the y axis represents a height relative to the ground. Posture parameters of a virtual object in a three-dimensional virtual environment include three-dimensional coordinates (X, Y, Z), where X and Z represent coordinates of the virtual object relative to the ground, and Y represents a height of the virtual object relative to the ground.

Camera model: a three-dimensional model located around a virtual object in a three-dimensional virtual environment. When a first-person viewing angle is used, the camera model is located near a head of the virtual object or in a head of the virtual object; and when a third-person viewing angle is used, the camera model is located behind a virtual object 110, and the three-dimensional virtual environment is observed from a viewing angle of the camera model.

FIG. 1 shows a schematic diagram of an interface of a three-dimensional virtual environment according to an exemplary embodiment. As shown in FIG. 1, a display interface 100 of the three-dimensional virtual environment includes a virtual object 110, a viewing angle switching region 120, an environment picture 130 of the three-dimensional virtual environment observed from a viewing angle of the virtual object 110, and a virtual left joystick 140, where the virtual left joystick 140 is an optional control element, and a user may control the virtual object 110 to move forward and backward, move to the left side, and move to the right side by using the virtual left joystick 140.

The three-dimensional virtual environment refers to a virtual environment generated in a running process of an application program, which can allow the user to enter a multimedia three-dimensional virtual world, and the user may control a virtual object in the three-dimensional virtual environment through an operating device or an operation interface, to observe objects, characters, and sceneries in the three-dimensional virtual environment from a viewing angle of the virtual object, or interact with objects, characters, and sceneries in the three-dimensional virtual environment through the virtual object, such as attack a target enemy by operating a virtual soldier.

The virtual object 110 is a three-dimensional model established in the three-dimensional virtual environment, and the environment picture of the three-dimensional virtual environment displayed in the display interface 100 includes objects observed from a viewing angle of the virtual object 110. For example, as shown in FIG. 1, in the observation from the third-person viewing angle located behind the virtual object 110, the displayed environment picture 130 of the three-dimensional virtual environment includes the earth 134, the sky 135, the horizon 133, a hill 131, and a factory 132. From the third-person viewing angle, the virtual object 110 is displayed in the display interface 130; and from the first-person viewing angle, the virtual object 110 is not displayed in the display interface 130.

In a possible implementation, the viewing angle of the virtual object 110 may be simulated (or implemented) by establishing a camera model in the three-dimensional virtual environment. When the first-person viewing angle is used, the camera model is located near a head of the virtual object or in a head of the virtual object; and when the third-person viewing angle is used, the camera model is located behind the virtual object 110, and the three-dimensional virtual environment is observed from a viewing angle of the camera model.

Figure 2:
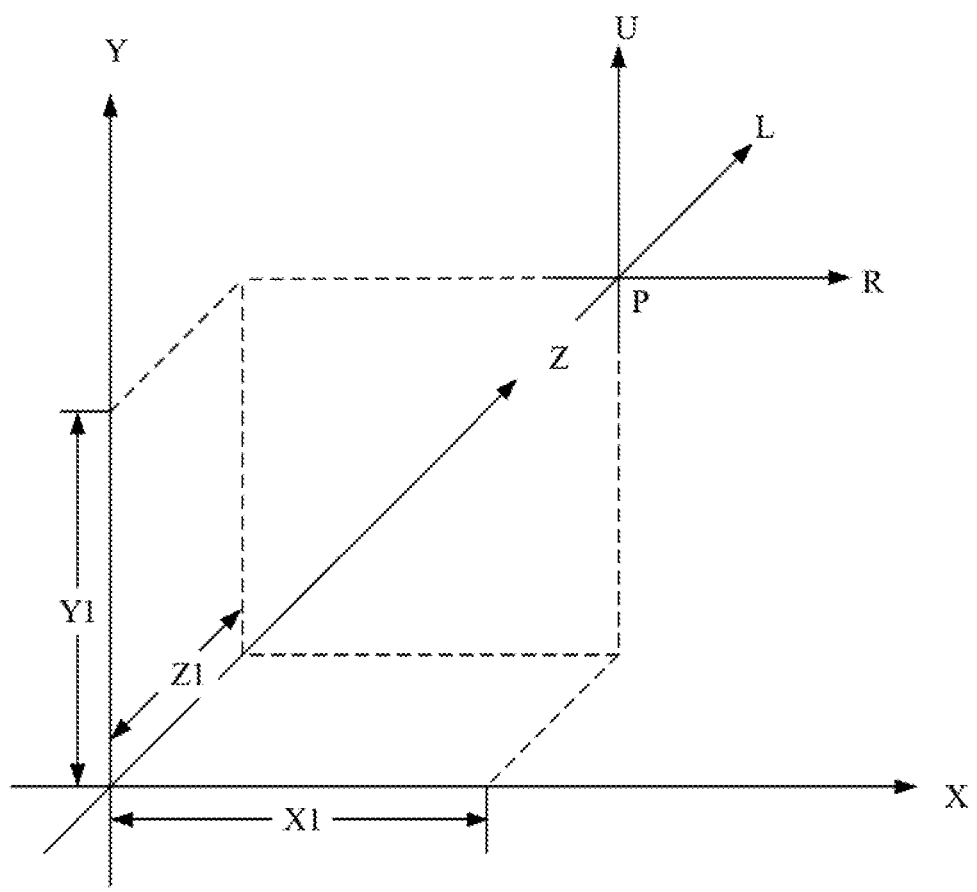
FIG. 2 is a schematic diagram of a world coordinate system in a three-dimensional virtual environment and a local coordinate system of a camera model according to an exemplary embodiment.

As shown in FIG. 2, the three-dimensional virtual environment includes a world coordinate system having an x axis, a y axis, and a z axis. Virtual models in the world coordinate system all have corresponding location coordinates. For example, location coordinates of the camera model are coordinates (X1, Y1, Z1) of a reference point P in the world coordinate system, and the reference point P may be a physical central point constructing the camera model. Meanwhile, the camera model in the three-dimensional virtual environment may be described according to a vertically upward vector U (Up), a horizontally rightward vector R (Right), a right front vector L (Look), and the reference point P. The motion of the camera model may include the following actions: rotation around the vector R, rotation around the vector U, rotation around the vector L, scanning along the vector R, rising and falling along the vector U, and translation along the vector L. In this embodiment, the viewing angle switching of the virtual object is mainly the rotation around the vector R and/or the rotation around the vector U.

Figure 3:
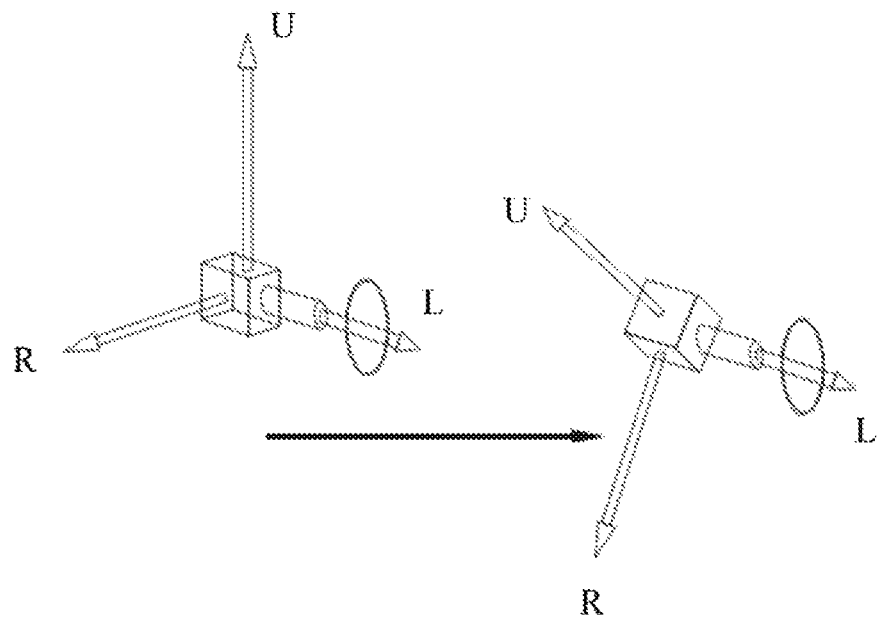
FIG. 3 is a schematic diagram of a camera model rotating around a vector L according to an exemplary embodiment.

FIG. 3 shows a schematic diagram of the camera model rotating around the vector L, the left side of the diagram is a camera model before the rotation, and the right side of the diagram is a camera model after the rotation around the vector L.

Figure 4:
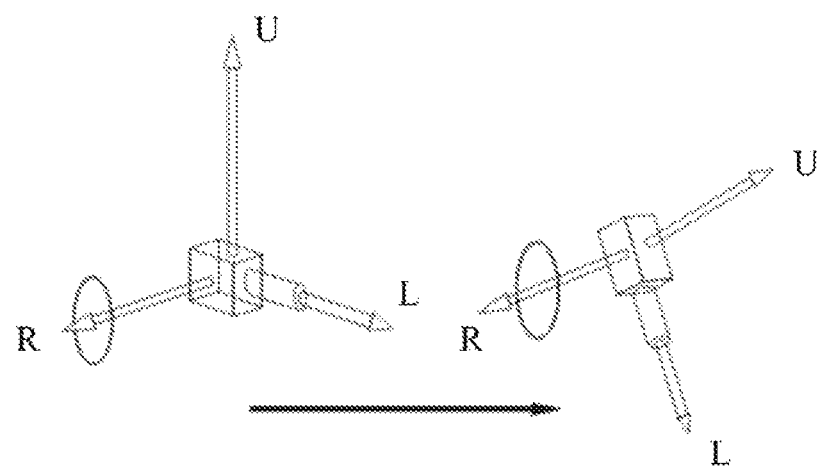
FIG. 4 is a schematic diagram of a camera model rotating around a vector R according to an exemplary embodiment.

FIG. 4 shows a schematic diagram of the camera model rotating around the vector R, the left side of the diagram is a camera model before the rotation, and the right side of the diagram is a camera model after the rotation around the vector R.

Figure 5:
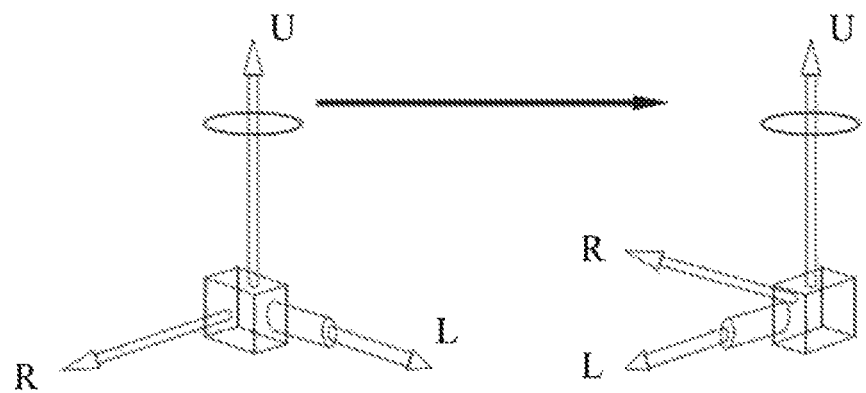
FIG. 5 is a schematic diagram of a camera model rotating around a vector U according to an exemplary embodiment.

FIG. 5 shows a schematic diagram of the camera model rotating around the vector U, the left side of the diagram is a camera model before the rotation, and the right side of the diagram is a camera model after the rotation around the vector U.

The implementation of the camera model may be generally expanded from the rotation of the camera model, the scaling of the camera model, and the shaking of the camera model. Attributes of the camera model include a viewing angle, a visual range, a moving speed of a wheel, a moving acceleration of the wheel, an observation point of a virtual object in a three-dimensional virtual environment, and a height of the virtual object.

Modes and parameters related to the camera model may be defined as follows:

Projection: projection manners are divided into a perspective mode and an orthographic mode.

Perspective: the camera model renders observable objects in a full perspective manner, to generate a foreshortening effect. Parameters of the perspective mode include a field of view.

Orthographic: the camera model uniformly renders observable objects in a manner with no sense of perspective. A parameter of the orthographic mode is a size of view.

Clipping Planes: a range rendered by the camera model, including a nearest point and a farthest point.

Viewport Rect: four values are used for controlling a location and a size of a viewport of the camera model in a display screen, and a screen coordinate system is used. The viewport rect includes three parameters: x (a starting point of a horizontal location), y (a starting point of a vertical location), and w (a width).

Figure 6:
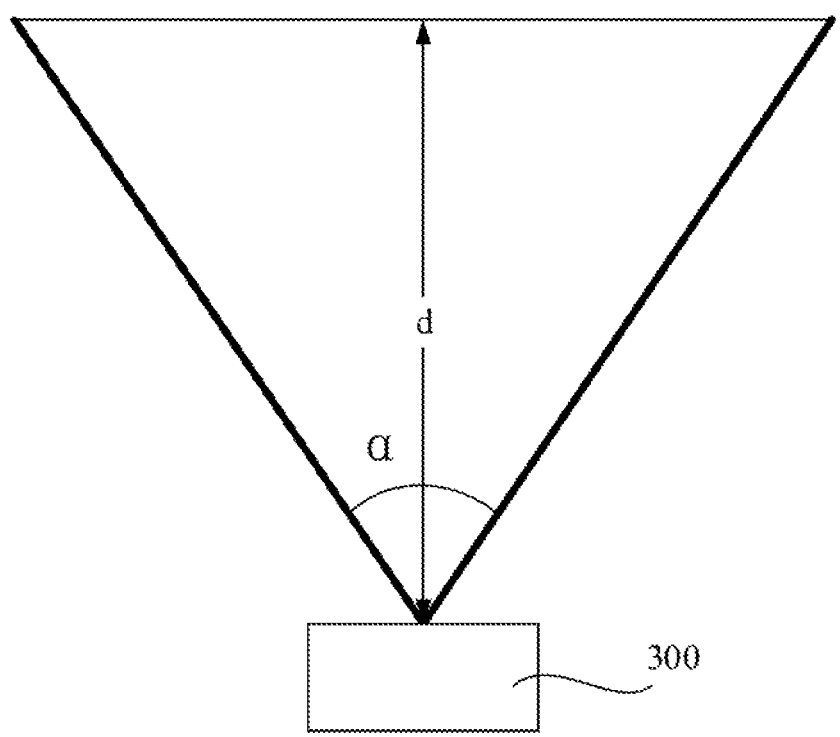
FIG. 6 is a schematic diagram of a viewing angle of a camera model in a three-dimensional virtual environment according to an exemplary embodiment.

As shown in FIG. 6, a camera model 300 includes a fixed viewing angle α and a fixed visual range d, and the environment picture of the three-dimensional virtual environment displayed in the display interface is a local environment of the three-dimensional virtual environment included within the viewing angle and the visual range of the camera model. In this embodiment, a direction of the viewing angle α is a direction to which a central axis of the viewing angle α points, and optionally, the direction of the viewing angle α is a direction of the vector L.

Figure 7:
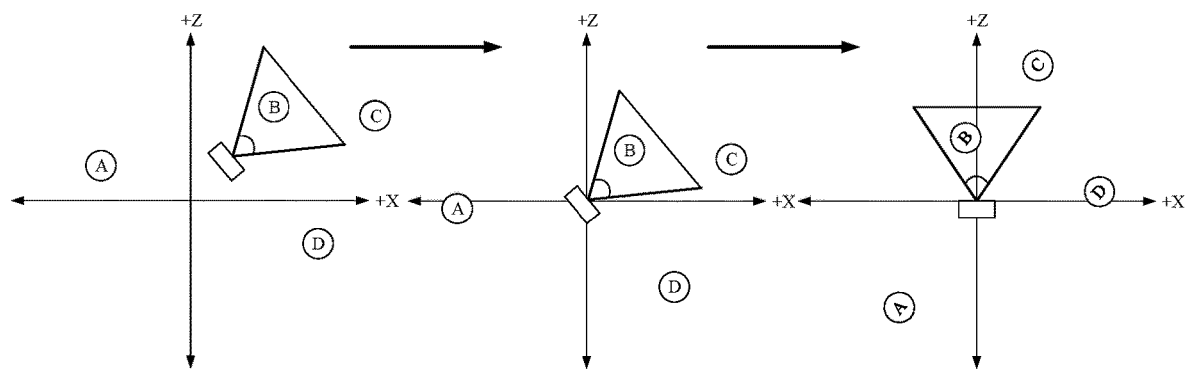
FIG. 7 is a schematic diagram of view transformations of a camera model according to an exemplary embodiment.

As shown in FIG. 7, view transformations of the camera model are to transform the camera model to an origin of the world coordinate system, and rotate the camera model to make an optical axis of the camera model to be consistent with a positive direction of the z axis of the world coordinate system. All objects in the three-dimensional virtual environment, for example, objects A, B, C, and D in FIG. 7 all transform along with the camera model, to ensure a constant field of view of the camera model.

Figure 8:
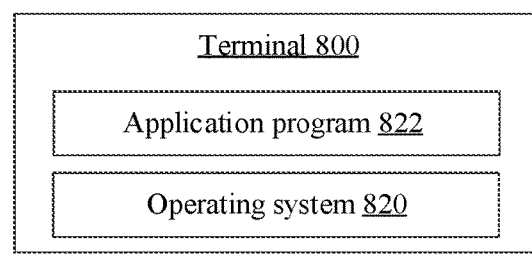
FIG. 8 is a schematic diagram of an implementation environment according to an exemplary embodiment.

FIG. 8 shows a structural block diagram of a terminal according to an exemplary embodiment. The terminal 800 includes: an operating system 820 and an application program 822.

The operating system 820 is basic software provided for the application program 822 to perform secure access to computer hardware.

The application program 822 is an application program supporting a virtual environment. Optionally, the application program 822 is an application program supporting a three-dimensional virtual environment. The application program 822 may be any one of a virtual reality application program, a three-dimensional map application program, a military simulation application program, a third-person shooting (TPS) game, a first-person shooting (FPS) game, an MOBA game, and a multiplayer shooting survival game. The application program 822 may be a standalone application program, such as a standalone three-dimensional game application program.

Figure 9:
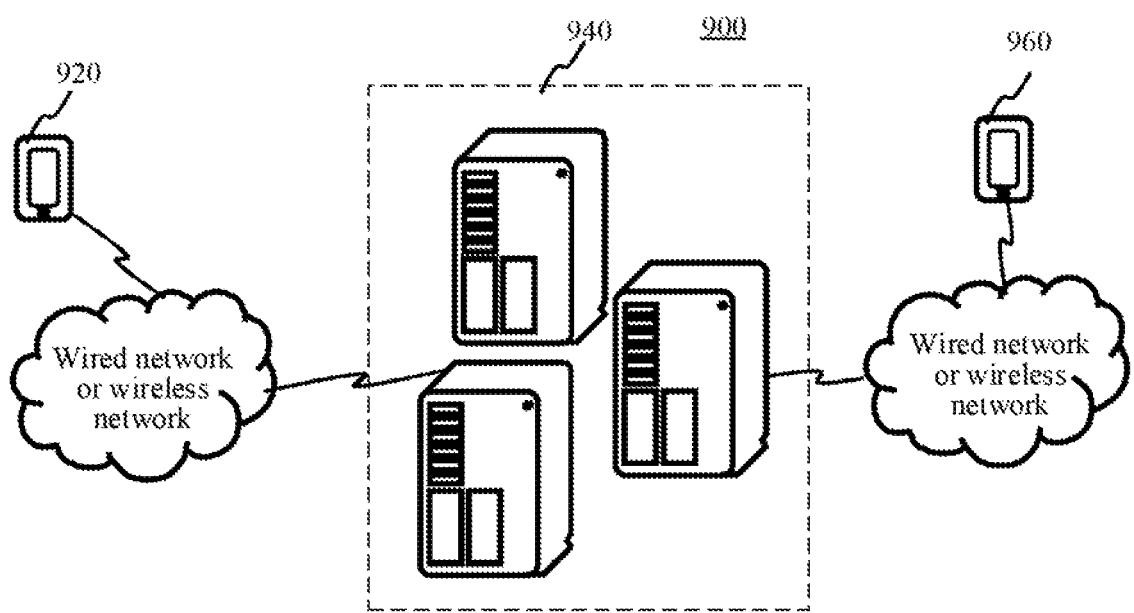
FIG. 9 is a schematic diagram of an implementation environment according to an exemplary embodiment.

FIG. 9 shows a structural block diagram of a computer system according to an exemplary embodiment. The computer system 900 includes a first terminal 920, a server 940, and a second terminal 960.

An application program supporting a virtual environment is installed and run in the first terminal 920. The application program may be any one of a virtual reality application program, a three-dimensional map application program, a military simulation application program, a TPS game, an FPS game, an MOBA game, and a multiplayer shooting survival game. The first terminal 920 is a terminal used by a first user, and the first user uses the first terminal 920 to control a first virtual object in the virtual environment to perform a movement. The movement includes, but is not limited to, at least one of body posture adjustment, crawling, walking, running, cycling, jumping, driving, picking, shooting, attacking, and throwing. For example, the first virtual object is a first virtual character, such as a simulated character role or a cartoon character role.

The first terminal 920 is connected to the server 940 through a wireless network or a wired network.

The server 940 includes at least one of one server, a plurality of servers, a cloud computing platform, and a virtualization center. The server 940 is configured to provide background services for the application program supporting a three-dimensional virtual environment. Optionally, the server 940 takes on primary computing work, and the first terminal 920 and the second terminal 960 take on secondary computing work; alternatively, the server 940 takes on secondary computing work, and the first terminal 920 and the second terminal 960 take on primary computing work; alternatively, collaborative computing is performed by using a distributed computing architecture among the server 940, the first terminal 920, and the second terminal 960.

An application program supporting a virtual environment is installed and run in the second terminal 960. The application program may be any one of a virtual reality application program, a three-dimensional map application program, a military simulation application program, an FPS game, an MOBA game, and a multiplayer shooting survival game. The second terminal 960 is a terminal used by a second user, and the second user uses the second terminal 960 to control a second virtual object in the virtual environment to perform a movement. The movement includes, but is not limited to, at least one of body posture adjustment, crawling, walking, running, cycling, jumping, driving, picking, shooting, attacking, and throwing. For example, the second virtual object is a second virtual character, such as a simulated character role or a cartoon character role.

Optionally, the first virtual character and the second virtual character are located in the same virtual environment. Optionally, the first virtual character and the second virtual character may belong to the same team or the same organization, have a friend relationship, or have a temporary communication permission. Optionally, the first virtual character and the second virtual character may alternatively belong to different teams, different organizations, or two groups hostile to each other.

Optionally, the application programs installed in the first terminal 920 and the second terminal 960 are the same, or the application programs installed in the two terminals are the same type of application programs of different control system platforms. The first terminal 920 may generally refer to one of a plurality of terminals, and the second terminal 960 may generally refer to one of a plurality of terminals. In this embodiment, description is made by using only the first terminal 920 and the second terminal 960 as an example. Terminal types of the first terminal 920 and the second terminal 960 are the same or different. The terminal type includes at least one of a game console, a desktop computer, a smartphone, a tablet computer, an ebook reader, a moving picture experts group audio layer III (MP3) player, a moving picture experts group audio layer IV (MP4) player, and a laptop computer. In the following embodiment, description is made by using an example in which the terminal is a mobile terminal.

Figure 10:
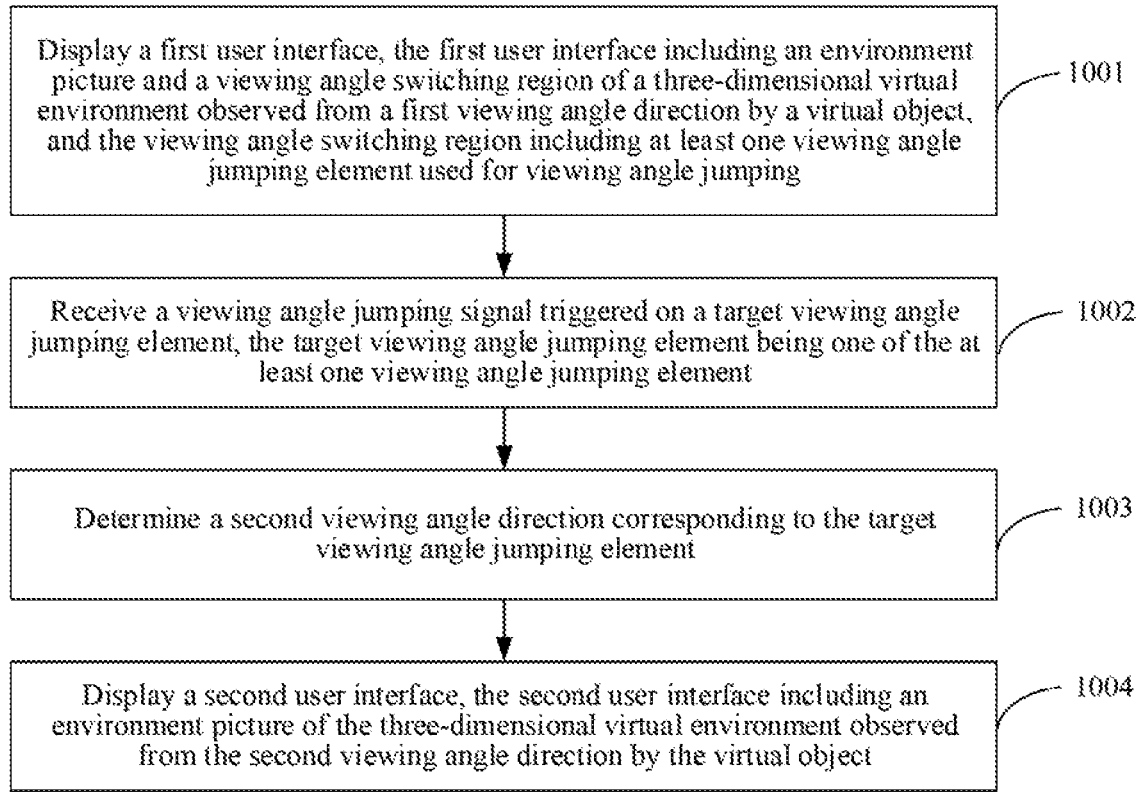
FIG. 10 is a flowchart of a viewing angle switching method for a virtual environment according to an exemplary embodiment.

FIG. 10 shows a flowchart of a viewing angle switching method for a virtual environment according to an exemplary embodiment. The method may be applied to the terminals in the embodiments of FIG. 8 and FIG. 9 or applied to the server in the embodiment of FIG. 9. In this embodiment, description is made by using an example in which the method is applied to a terminal, and the method includes the following steps:

Step 1001: Display a first user interface.

A terminal displays a first user interface, the first user interface including an environment picture of a three-dimensional virtual environment observed from a first viewing angle direction by a virtual object and a viewing angle switching region, and the viewing angle switching region including at least one viewing angle jumping element used for performing viewing angle jumping, where the viewing angle jumping element is an element control in the viewing angle switching region. Optionally, the first viewing angle direction is a viewing angle used for observation from a first-person viewing angle of the virtual object, or a third-person viewing angle located around the virtual object.

Optionally, the viewing angle jumping element includes a jumping element represented by using a first direction scale, and the first direction scale is used for representing all viewing angle directions or some viewing angle directions among 360-degree horizontal viewing angle directions centered on a location in which the virtual object is located.

Figure 11:
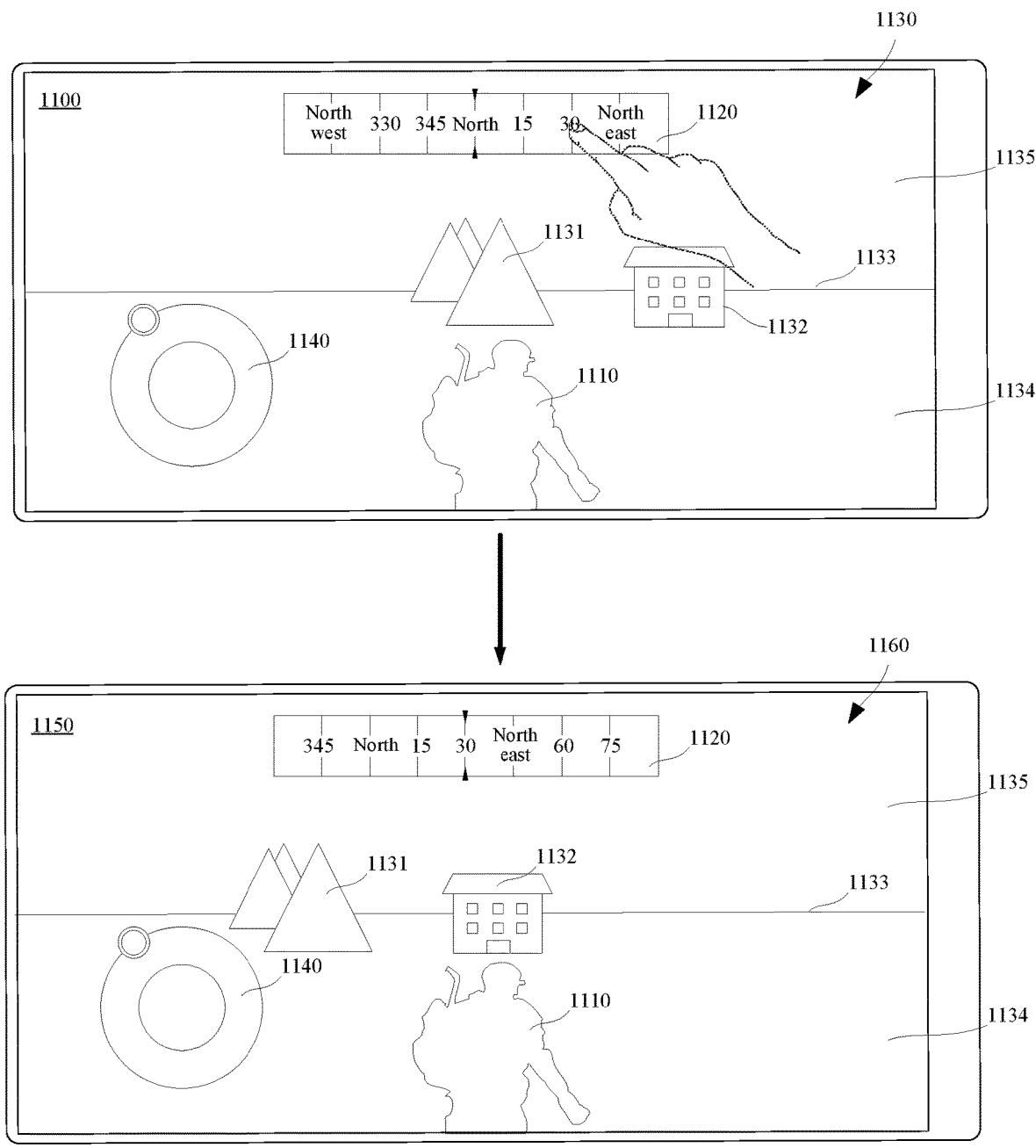
FIG. 11 is a schematic diagram of a user interface of a three-dimensional virtual environment according to an exemplary embodiment.

For example, as shown in FIG. 11, a first user interface 1100 includes a virtual object 1110, an environment picture 1130, a viewing angle switching region 1120, and a virtual left joystick 1140. The environment picture 1130 in the first user interface 1100 is an environment picture of a three-dimensional virtual environment observed from a first viewing angle direction by the virtual object. The environment picture includes a hill 1131 located in front of the virtual object 1110, and a factory 1132, the earth 1134, the sky 1135, and the horizon 1133 that are located in the northeast direction of the virtual object 1110. The viewing angle switching region 1120 is overlapped on the environment picture 1130 for displaying, and is a long-strip shaped region located at a top edge of the environment picture 530. The viewing angle switching region includes the viewing angle jumping element represented by the first direction scale. In this exemplary embodiment, the first direction scale is used for representing all viewing angle directions among the 360-degree horizontal viewing angle directions centered on a location in which the virtual object is located. If the north direction is 0 degrees, according to a clockwise sequence, the 45-degree direction is the northeast direction, the 90-degree direction is the east direction, the 135-degree direction is the southeast direction, the 180-degree direction is the south direction, the 225-degree direction is the southwest direction, the 270-degree direction is the west direction, and the 315-degree direction is the northwest direction.

Optionally, the viewing angle jumping element includes a jumping element represented by using a second direction scale, and the second direction scale is used for representing all viewing angle directions or some viewing angle directions from a first looking up direction to a second looking down direction of the virtual object.

Figure 12:
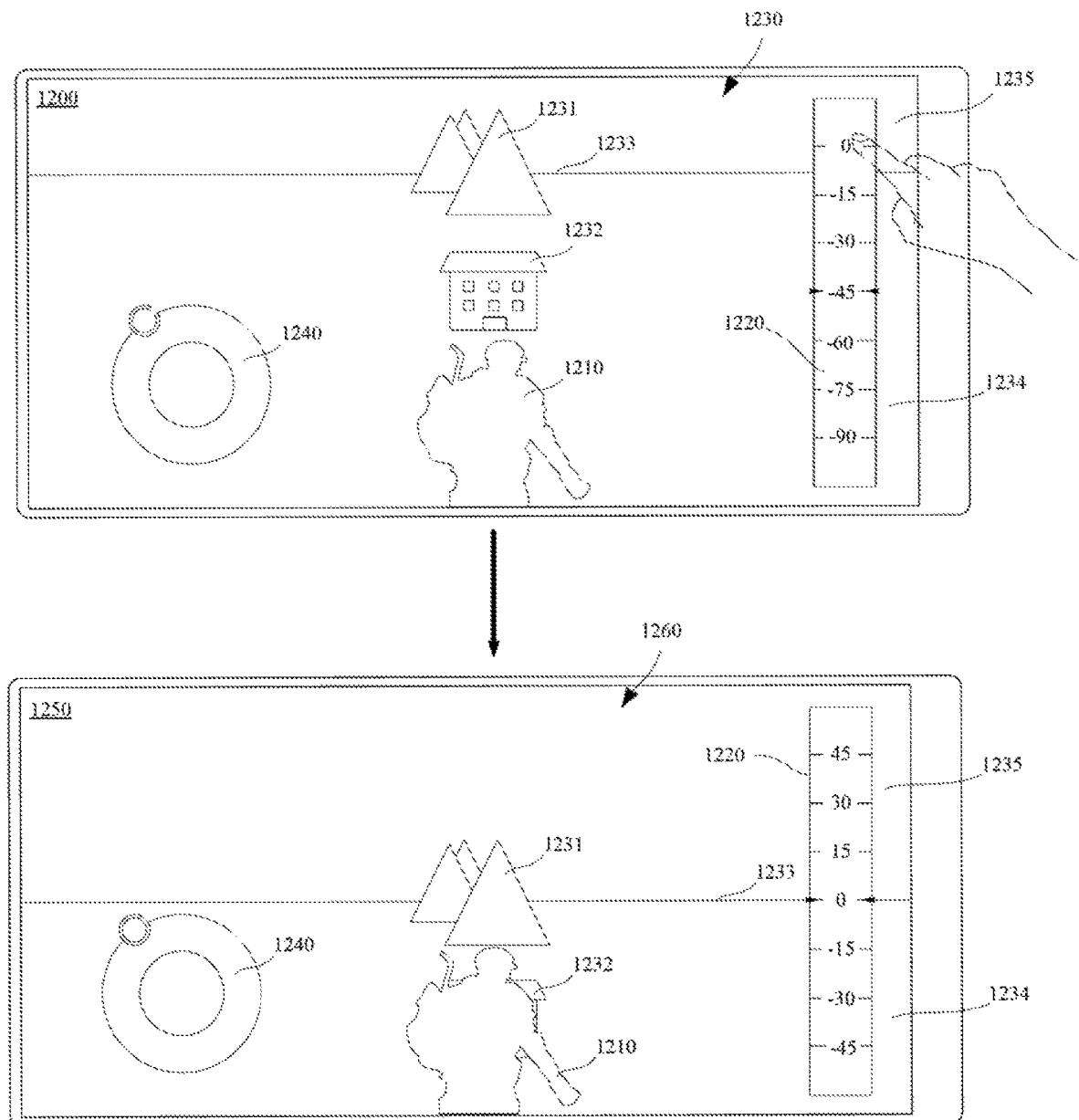
FIG. 12 is a schematic diagram of a user interface of a three-dimensional virtual environment according to an exemplary embodiment.

For example, as shown in FIG. 12, a first user interface 1200 includes a virtual object 1210, an environment picture 1230, a viewing angle switching region 1220, and a virtual left joystick 1240. The environment picture 1230 in the first user interface 1200 is an environment picture of a three-dimensional virtual environment observed from a first viewing angle direction by the virtual object 1210. The environment picture includes a hill 1231 that is relatively far away from the virtual object 1210, and a factory 1232, the earth 1234, the sky 1235, and the horizon 1233 that are relatively close to the virtual object 1210, where the viewing angle of the virtual object is located in a −45-degree direction of the overlooking. The viewing angle switching region 620 is overlapped on the environment picture 1230 for displaying, and is a long-strip shaped region located at a right edge of the environment picture 1230. The viewing angle switching region includes a viewing angle jumping element represented by a second direction scale. In this exemplary embodiment, the second direction scale is used for representing all viewing angle directions from the first looking up direction to the second looking down direction of the virtual object, where a vertically upward direction is the first looking up direction and an angle corresponding to the direction is 90 degrees, and a vertically downward direction is the second looking down direction and an angle corresponding to the direction is −90 degrees.

Optionally, the viewing angle jumping element includes a jumping element represented by using first subregions, and each of the first subregions is used for representing one viewing angle direction among 360-degree horizontal viewing angle directions centered on a location in which the virtual object is located.

Figure 13:
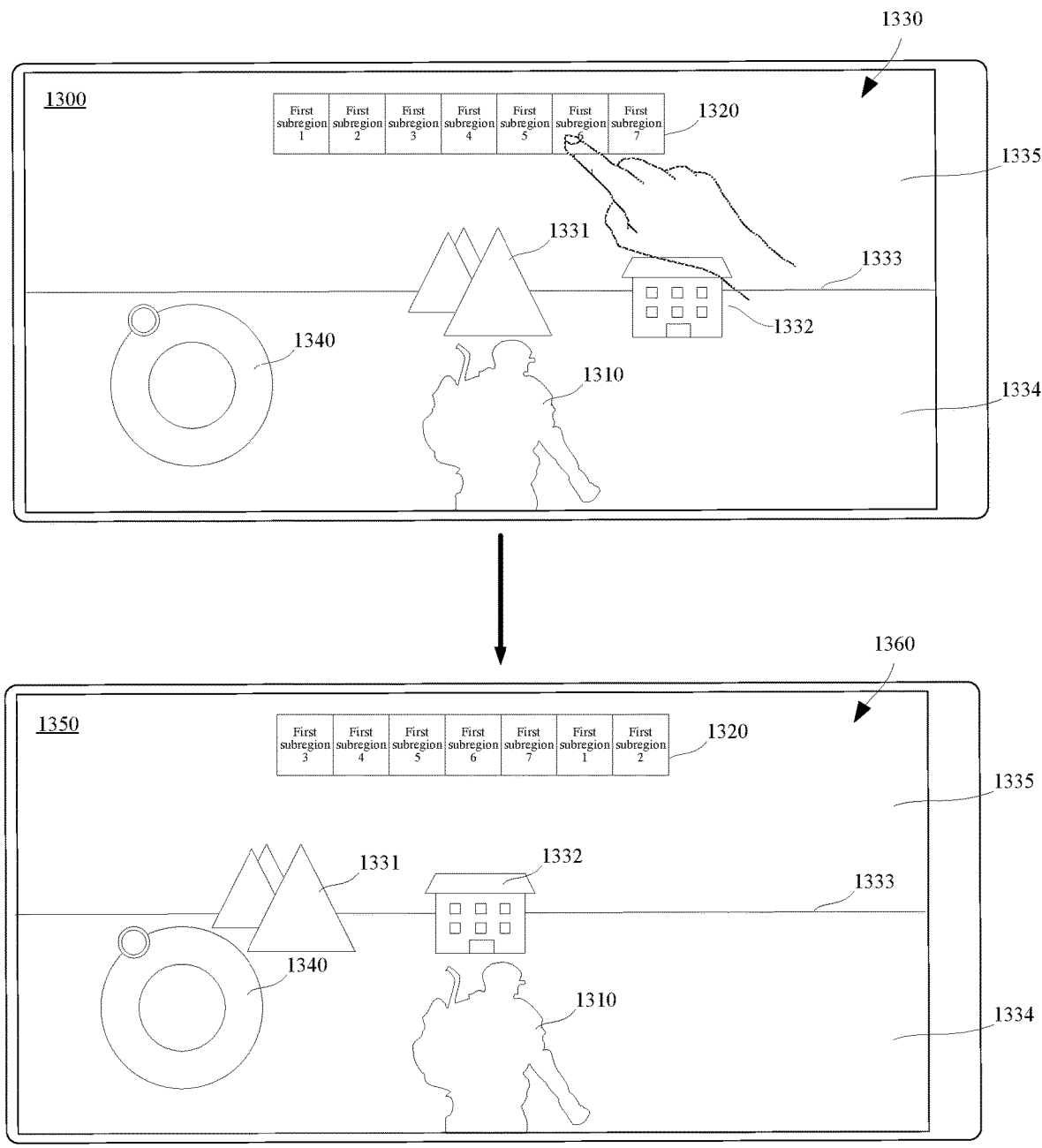
FIG. 13 is a schematic diagram of a user interface of a three-dimensional virtual environment according to an exemplary embodiment.

For example, as shown in FIG. 13, a first user interface 1300 includes a virtual object 1310, an environment picture 1330, a viewing angle switching region 1320, and a virtual left joystick 1340. The environment picture 1330 in the first user interface 1300 is an environment picture of a three-dimensional virtual environment observed from a first viewing angle direction by the virtual object 1310. The environment picture includes a hill 1331 located in front of the virtual object 1310, and a factory 1332, the earth 1334, the sky 1335, and the horizon 1333 that are located in the northeast direction of the virtual object 1310. The viewing angle switching region 1320 is overlapped on the environment picture 1330 for displaying, and is a long-strip shaped region located at a top edge of the environment picture 1330. The viewing angle switching region includes the viewing angle jumping element represented by a plurality of the first subregions. Each of the first subregions corresponds to one viewing angle direction among the 360-degree horizontal viewing angle directions centered on a location in which the virtual object is located, where each of the first subregions may reflect a corresponding viewing angle direction by using an identifier or text.

Optionally, the viewing angle jumping element includes a jumping element represented by using second subregions, and each of the second subregions is used for representing one viewing angle direction from a first looking up direction to a second looking down direction of the virtual object.

Figure 14:
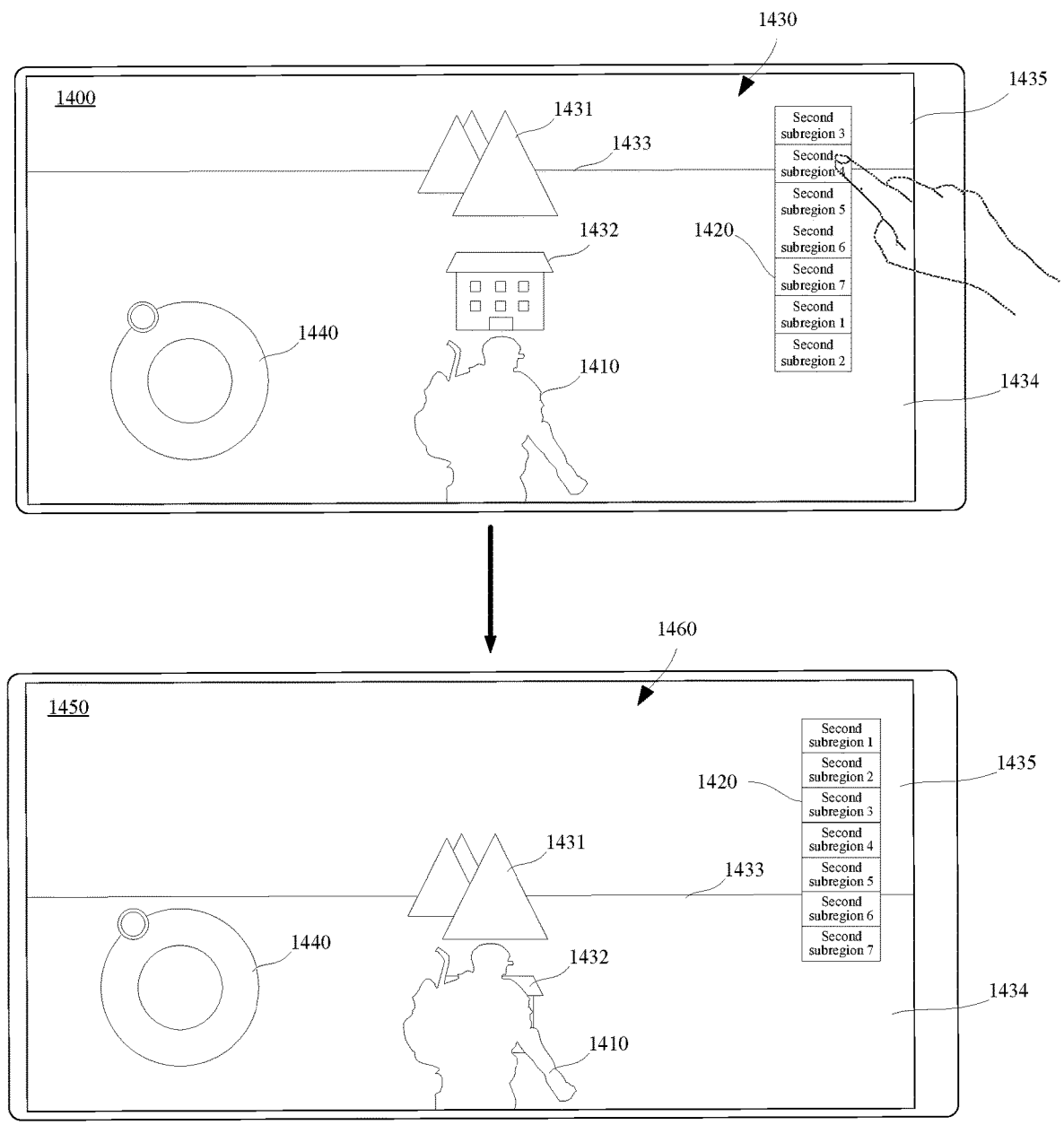
FIG. 14 is a schematic diagram of a user interface of a three-dimensional virtual environment according to an exemplary embodiment.

For example, as shown in FIG. 14, a first user interface 1400 includes a virtual object 1410, an environment picture 1430, a viewing angle switching region 1420, and a virtual left joystick 1440. The environment picture 1430 in the first user interface 1400 is an environment picture of a three-dimensional virtual environment observed from a first viewing angle direction by the virtual object 1410. The environment picture includes a hill 1431 that is relatively far away from the virtual object 1410, and a factory 1432, the earth 1434, the sky 1435, and the horizon 1433 that are relatively close to the virtual object 1410, where the viewing angle of the virtual object is located in a −45-degree direction of the overlooking. The viewing angle switching region 1420 is overlapped on the environment picture 1430 for displaying, and is a long-strip shaped region located at a right edge of the environment picture 1430. The viewing angle switching region includes the viewing angle jumping element represented by a plurality of the second subregions. Each of the second subregions corresponds to one viewing angle direction from the first looking up direction to the second looking down direction of the virtual object, where each of the second subregions may reflect a corresponding viewing angle direction by using an identifier or text.

The exemplary embodiments of FIG. 11, FIG. 12, FIG. 13, and FIG. 14 may be independently implemented, or the embodiments of FIG. 11 and FIG. 12 may be combined to implement, or the embodiments of FIG. 13 and FIG. 14 may be combined to implement, or the embodiments of FIG. 11 and FIG. 14 may be combined to implement, or the embodiments of FIG. 12 and FIG. 13 may be combined to implement.

Step 1002: Receive a viewing angle jumping signal triggered on a target viewing angle jumping element.

The terminal receives a viewing angle jumping signal triggered on a target viewing angle jumping element, and the viewing angle jumping signal is a signal generated when the user taps the target viewing angle jumping element, where the target viewing angle jumping element is one of the at least one viewing angle jumping element.

For example, as shown in FIG. 11, the user taps a target viewing angle switching element, such as a 30 degree scale in a scale ruler, in a viewing angle switching region 1120, to generate a viewing angle jumping signal, and the terminal receives the viewing angle jumping signal.

For example, as shown in FIG. 12, the user taps a target viewing angle switching element, such as a 0-degree scale in a scale ruler, in a viewing angle switching region 1220, to generate a viewing angle jumping signal, and the terminal receives the viewing angle jumping signal.

For example, as shown in FIG. 13, the user taps a target viewing angle switching element, such as a first subregion 6, in a viewing angle switching region 1320, to generate a viewing angle jumping signal, and the terminal receives the viewing angle jumping signal.

For example, as shown in FIG. 14, the user taps a target viewing angle switching element, such as a second subregion 4, in a viewing angle switching region 1420, to generate a viewing angle jumping signal, and the terminal receives the viewing angle jumping signal.

Step 1003: Determine a second viewing angle direction corresponding to the target viewing angle jumping element.

After obtaining the viewing angle jumping signal, the terminal determines a second viewing angle direction corresponding to the target viewing angle jumping element according to the viewing angle jumping signal.

For example, as shown in FIG. 11, the terminal determines, according to a viewing angle jumping signal generated by tapping the 30-degree scale by the user in the viewing angle switching region 1120, that the second viewing angle direction is 30 degrees north by east.

For example, as shown in FIG. 12, the terminal determines, according to a viewing angle jumping signal generated by tapping the 0-degree scale by the user in the viewing angle switching region 1220, that the second viewing angle direction is 0 degrees at eye level.

For example, as shown in FIG. 13, the terminal determines, according to a viewing angle jumping signal generated by tapping the first subregion 6 by the user in the viewing angle switching region 1320 and a preset direction corresponding to the first subregion 6, that the second viewing angle direction is 30 degrees north by east.

For example, as shown in FIG. 14, the terminal determines, according to a viewing angle jumping signal generated by tapping the second subregion 4 by the user in the viewing angle switching region 1420 and a preset direction corresponding to the second subregion 4, that the second viewing angle direction is 0 degrees at eye level.

Step 1004: Display a second user interface.

After obtaining the second viewing angle direction, the terminal displays a second user interface. The second user interface includes an environment picture of the three-dimensional virtual environment observed from the second viewing angle direction by the virtual object.

For example, as shown in FIG. 11, the terminal determines that the second viewing angle direction is 30 degrees north by east and displays a second user interface 1150. The second user interface 1150 includes an environment picture 1160 of the three-dimensional virtual environment observed by the virtual object 1110 in a direction of 30 degrees north by east, where the environment picture 1160 includes a factory 1132 located in front of the virtual object 1110, and a hill 1131, the sky 1135, the earth 1134, and the horizon 1133 that are located in a bit west of the front of the virtual object 1110.

For example, as shown in FIG. 12, the terminal determines that the second viewing angle direction is 0 degrees at eye level and displays a second user interface 1250. The second user interface 1250 includes an environment picture 1260 of the three-dimensional virtual environment observed by the virtual object 1210 in a 0-degree direction at eye level, where the environment picture 1260 includes a hill 1231 located in front of and relatively far away from the virtual object 1110, and a factory 1232, the sky 1235, the earth 1234, and the horizon 1233 that are located in front of and relatively close to the virtual object 1210.

For example, as shown in FIG. 13, the terminal determines that the second viewing angle direction is 30 degrees north by east and displays a second user interface 1350. The second user interface 1350 includes an environment picture 1360 of the three-dimensional virtual environment observed by the virtual object 1310 in a direction of 30 degrees north by east, where the environment picture 1360 includes a factory 1332 located in front of the virtual object 1310, and a hill 1331, the sky 1335, the earth 1334, and the horizon 1333 that are located in a bit west of the front of the virtual object 1310.

For example, as shown in FIG. 14, the terminal determines that the second viewing angle direction is 0 degrees at eye level and displays a second user interface 1450. The second user interface 1450 includes an environment picture 1460 of the three-dimensional virtual environment observed by the virtual object 1410 in a 0-degree direction at eye level, where the environment picture 1460 includes a hill 1431 located in front of and relatively far away from the virtual object 1410, and a factory 1432, the sky 1435, the earth 1434, and the horizon 1433 that are located in front of and relatively close to the virtual object 1410.

Based on the above, in this embodiment, by receiving the viewing angle jumping signal triggered on the target viewing angle jumping element in the viewing angle switching region, and displaying the second user interface according to the second viewing angle direction corresponding to the target viewing angle jumping element, the problem of low efficiency of human-computer interaction when a viewing angle direction of a virtual object is changed by using a right joystick in the related art is resolved. Because the viewing angle direction of the virtual object is changed by tapping the target viewing angle jumping element instead of using a right joystick, the switching speed of the viewing angle is increased, so as to improve the efficiency of human-computer interaction.

Figure 15:
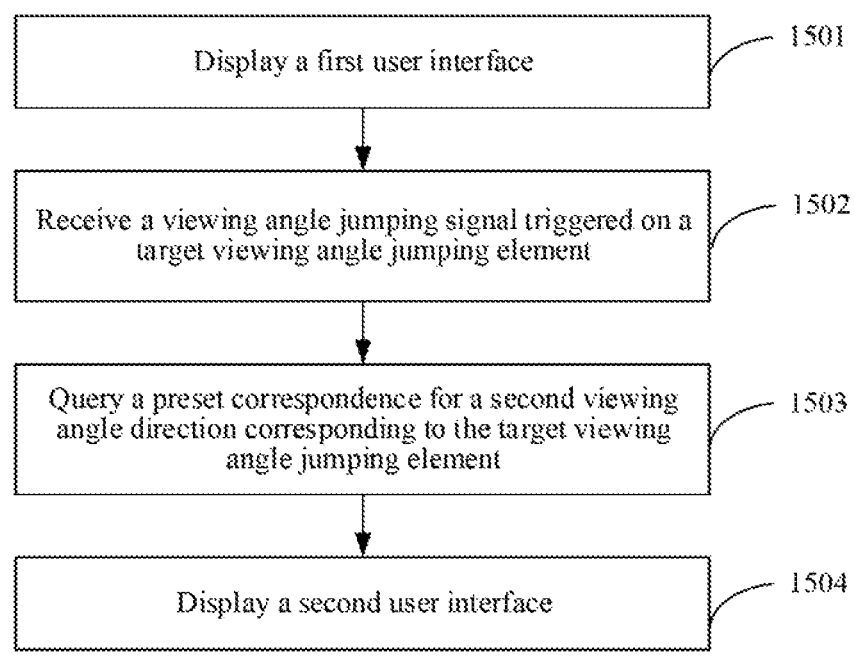
FIG. 15 is a flowchart of a viewing angle switching method for a virtual environment according to an exemplary embodiment.

FIG. 15 shows a flowchart of a viewing angle switching method for a virtual environment according to an exemplary embodiment. The method may be applied to the terminals in the embodiments of FIG. 8 and FIG. 9 or applied to the server in the embodiment of FIG. 9. In this embodiment, description is made by using an example in which the method is applied to a terminal, and the method includes the following steps:

Step 1501: Display a first user interface.

A terminal displays a first user interface, the first user interface including an environment picture of a three-dimensional virtual environment observed from a first viewing angle direction by a virtual object and a viewing angle switching region, and the viewing angle switching region including at least one viewing angle jumping element used for performing viewing angle jumping, where the viewing angle jumping element is an element control in the viewing angle switching region.

Step 1502: Receive a viewing angle jumping signal triggered on a target viewing angle jumping element.

The terminal receives a viewing angle jumping signal triggered on a target viewing angle jumping element, and the viewing angle jumping signal is a signal generated when the user taps the target viewing angle jumping element, where the target viewing angle jumping element is one of the at least one viewing angle jumping element.

For example, a complete tapping event at least includes a finger ACTION_DOWN action and a finger ACTION_UP action, and may also include at least one finger ACTION_MOVE action, where each complete tapping event is started from ACTION_DOWN. Each action may have corresponding touch coordinates in the touch screen.

When the finger of the user presses on the touch display screen, the terminal starts to record starting coordinates corresponding to a pressed region, and when the user lifts the finger, the terminal obtains ending coordinates of the tapping operation of the user. The terminal determines whether the starting coordinates, the ending coordinates, and sliding coordinates between the starting coordinates and the ending coordinates are located in the target viewing angle jumping element, and if all coordinates corresponding to the tapping operation of the user are located in the target viewing angle jumping element and a sliding distance exceeds a threshold, it is determined that a control corresponding to the tapping operation of the user is the target viewing angle jumping element.

Step 1503: Query a preset correspondence for a second viewing angle direction corresponding to the target viewing angle jumping element.

After obtaining the viewing angle jumping signal, the terminal queries a preset correspondence for a second viewing angle direction corresponding to the target viewing angle jumping element, where the preset correspondence stores a viewing angle direction respectively corresponding to the at least one viewing angle jumping element.

For example, the terminal stores a correspondence table of each viewing angle jumping element and the corresponding viewing angle direction, and the terminal obtains a viewing angle direction corresponding to the target viewing angle jumping element by querying the correspondence table, where the correspondence table may be shown in Table 1.

TABLE 1

| Scale value | Viewing angle direction |
|---|---|
| 0 | North direction |
| 15 | 15 degrees north by east |
| 30 | 30 degrees north by east |
| 45 | Northeast direction |

For example, as shown in FIG. 11, the terminal stores the viewing angle direction corresponding to each first direction scale, and the terminal may query for a viewing angle direction corresponding to a target scale. For example, if the target scale is 30 degrees, a corresponding direction is 30 degrees north by east.

For example, as shown in FIG. 12, the terminal stores the viewing angle direction corresponding to each second direction scale, and the terminal may query for a viewing angle direction corresponding to a target scale. For example, if the target scale is 0 degrees, a corresponding direction is 0 degrees at eye level.

For example, as shown in FIG. 13, the terminal stores the viewing angle direction corresponding to each first subregion, and the terminal may query for a viewing angle direction corresponding to a target subregion. For example, if the target subregion is a first subregion 6, a corresponding direction is 30 degrees north by east.

For example, as shown in FIG. 14, the terminal stores the viewing angle direction corresponding to each second subregion, and the terminal may query for a viewing angle direction corresponding to a target subregion. For example, if the target subregion is a second subregion 4, a corresponding direction is 0 degrees at eye level.

Step 1504: Display a second user interface.

After obtaining the second viewing angle direction, the terminal displays a second user interface. The second user interface includes an environment picture of the three-dimensional virtual environment observed from the second viewing angle direction by the virtual object.

For example, as shown in FIG. 11, the terminal determines that the second viewing angle direction is 30 degrees north by east and displays a second user interface 1150. The second user interface 1150 includes an environment picture 1160 of the three-dimensional virtual environment observed by the virtual object 1110 in a direction of 30 degrees north by east, where the environment picture 1160 includes a factory 1132 located in front of the virtual object 1110, and a hill 1131, the sky 1135, the earth 1134, and the horizon 1133 that are located in a bit west of the front of the virtual object 1110.

For example, as shown in FIG. 12, the terminal determines that the second viewing angle direction is 0 degrees at eye level and displays a second user interface 1250. The second user interface 1250 includes an environment picture 1260 of the three-dimensional virtual environment observed by the virtual object 1210 in a 0-degree direction at eye level, where the environment picture 1260 includes a hill 1231 located in front of and relatively far away from the virtual object 1210, and a factory 1232, the sky 1235, the earth 1234, and the horizon 1233 that are located in front of and relatively close to the virtual object 1210.

For example, as shown in FIG. 13, the terminal determines that the second viewing angle direction is 30 degrees north by east and displays a second user interface 1350. The second user interface 1350 includes an environment picture 1360 of the three-dimensional virtual environment observed by the virtual object 1310 in a direction of 30 degrees north by east, where the environment picture 1360 includes a factory 1332 located in front of the virtual object 1310, and a hill 1331, the sky 1335, the earth 1334, and the horizon 1333 that are located in a bit west of the front of the virtual object 1310.

For example, as shown in FIG. 14, the terminal determines that the second viewing angle direction is 0 degrees at eye level and displays a second user interface 1450. The second user interface 1450 includes an environment picture 1460 of the three-dimensional virtual environment observed by the virtual object 1410 in a 0-degree direction at eye level, where the environment picture 1460 includes a hill 1431 located in front of and relatively far away from the virtual object 1410, and a factory 1432, the sky 1435, the earth 1434, and the horizon 1433 that are located in front of and relatively close to the virtual object 1410.

When the viewing angle switching method in this embodiment is applied to a server, step 1501 and step 1502 are performed in a terminal, and step 1503 is performed by the server. After obtaining a viewing angle jumping signal, the terminal transmits the viewing angle jumping signal to the server, the server queries a locally stored correspondence for a second viewing angle direction corresponding to a target viewing angle jumping element according to the viewing angle jumping signal and transmits the second viewing angle direction to the terminal, and the terminal displays a second user interface according to the second viewing angle direction transmitted by the server.

Based on the above, in this embodiment, by receiving the viewing angle jumping signal triggered on the target viewing angle jumping element in the viewing angle switching region, and displaying the second user interface according to the second viewing angle direction corresponding to the target viewing angle jumping element, the problem of low efficiency of human-computer interaction when a viewing angle direction of a virtual object is changed by using a right sliding screen in the related art is resolved. Because the viewing angle direction of the virtual object is changed by tapping a target viewing angle jumping element instead of using the right sliding screen, the switching speed of the viewing angle is increased, so as to improve the efficiency of human-computer interaction.

Further, in this embodiment, a second viewing angle direction is determined by querying for the second viewing angle direction corresponding to the target viewing angle jumping element, to display a second user interface. Because the speed of obtaining the second viewing angle direction in a manner of querying a correspondence is relatively fast, the switching speed of the viewing angle is increased.

Figure 16:
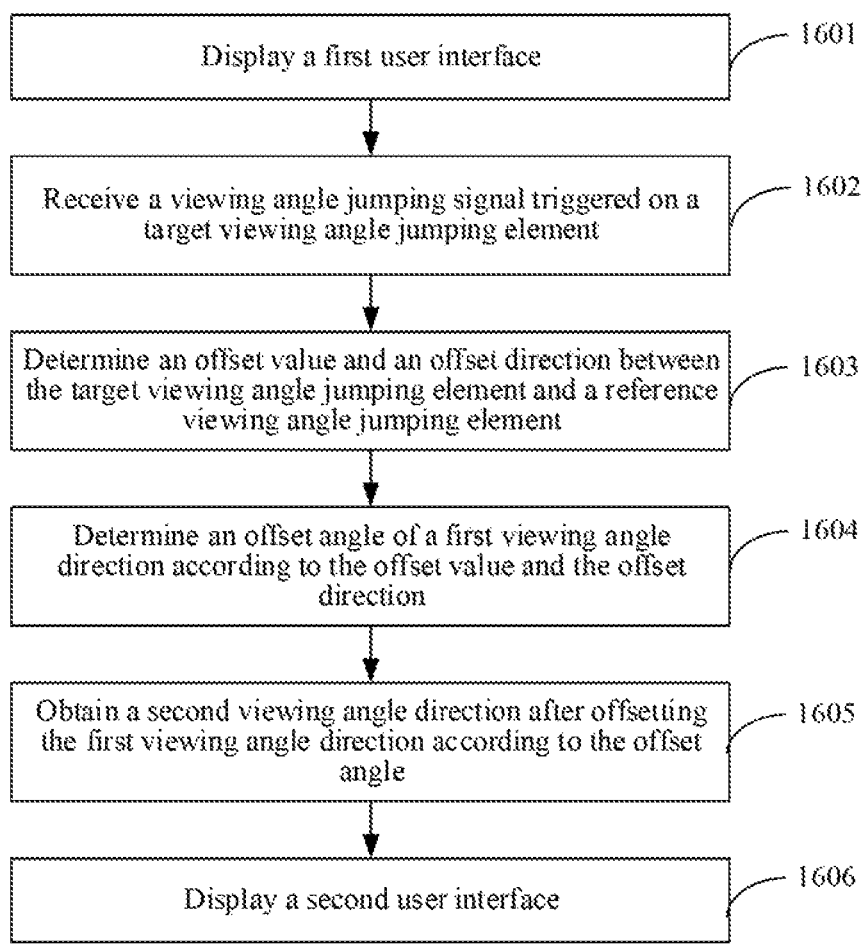
FIG. 16 is a flowchart of a viewing angle switching method for a virtual environment according to an exemplary embodiment.

FIG. 16 shows a flowchart of a viewing angle switching method for a virtual environment according to an exemplary embodiment. The method may be applied to the terminals in the embodiments of FIG. 8 and FIG. 9 or applied to the server in the embodiment of FIG. 9. In this embodiment, description is made by using an example in which the method is applied to a terminal, and the method includes the following steps:

Step 1601: Display a first user interface.

A terminal displays a first user interface, the first user interface including an environment picture of a three-dimensional virtual environment observed from a first viewing angle direction by a virtual object and a viewing angle switching region, and the viewing angle switching region including at least one viewing angle jumping element used for performing viewing angle jumping, where the viewing angle jumping element is an element control in the viewing angle switching region.

Figure 17:
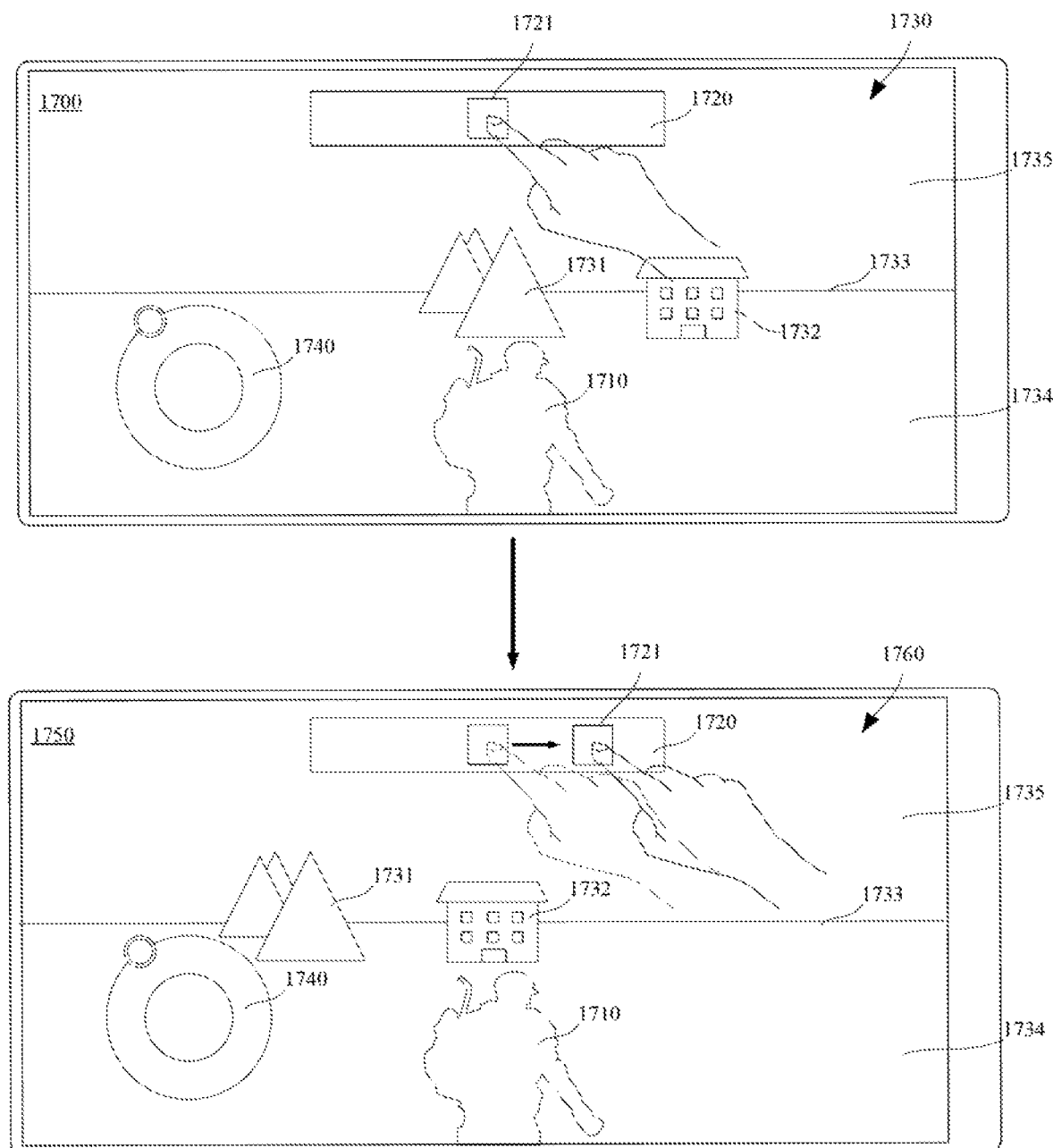
FIG. 17 is a schematic diagram of a user interface of a three-dimensional virtual environment according to an exemplary embodiment.

For example, as shown in FIG. 17, a first user interface 1700 includes a virtual object 1710, an environment picture 1730, a viewing angle switching region 1720, and a virtual left joystick 1740. The environment picture 1730 in the first user interface 1700 is an environment picture of a three-dimensional virtual environment observed from a first viewing angle direction by the virtual object 1710. The environment picture includes a hill 1731 located in front of the virtual object 1710, and a factory 1732, the earth 1734, the sky 1735, and the horizon 1733 that are located in the northeast direction of the virtual object 1710. The viewing angle switching region 1720 is overlapped on the environment picture 1730 for displaying and is a long-strip shaped region located at a top edge of the environment picture 1730. A reference viewing angle jumping element is a central region located in the viewing angle switching region 1720, a slider 1721 is displayed in the viewing angle switching region 1720, and the user may press the slider 1721 to slide the slider to a region in which a target viewing angle jumping element is located.

Figure 18:
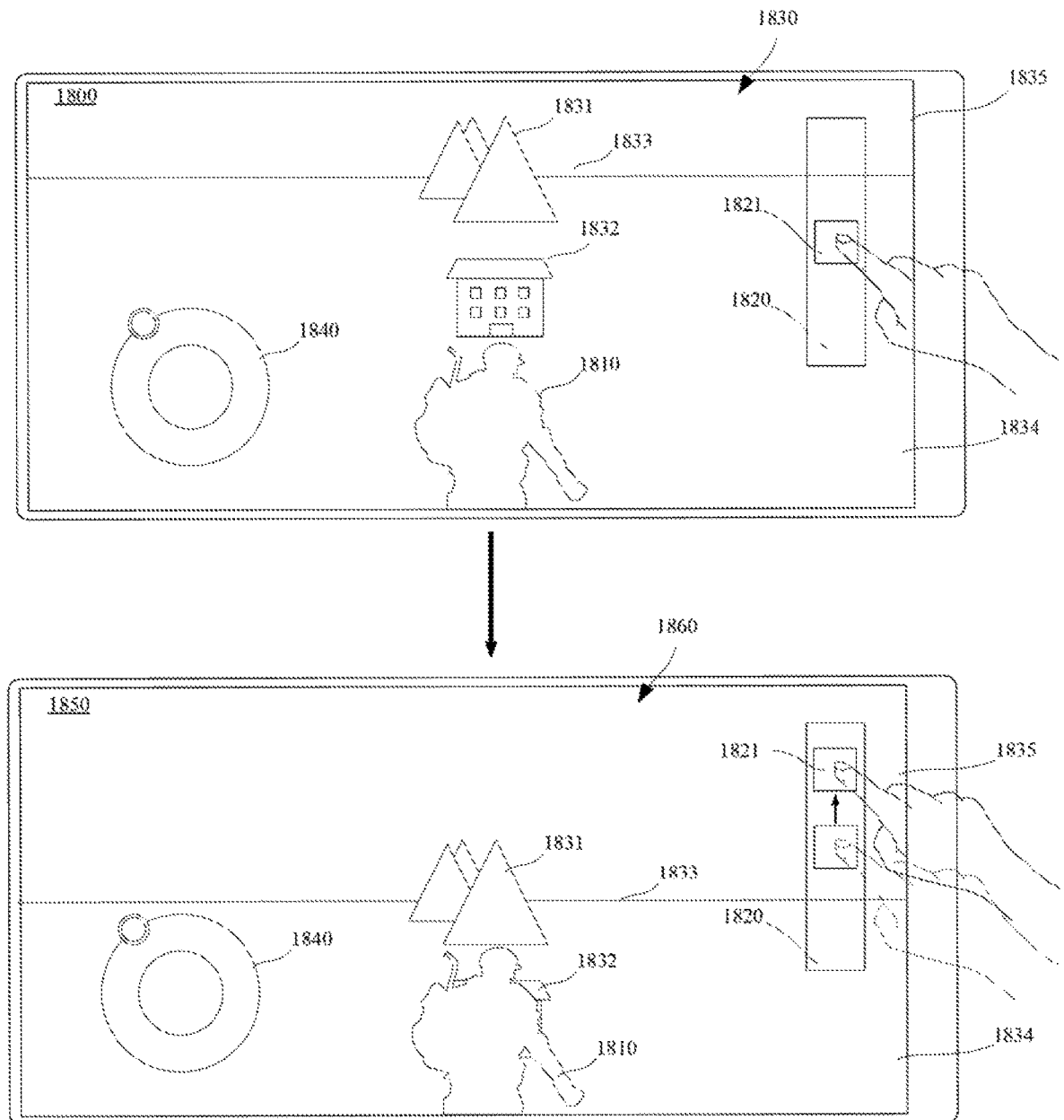
FIG. 18 is a schematic diagram of a user interface of a three-dimensional virtual environment according to an exemplary embodiment.

For example, as shown in FIG. 18, a first user interface 1800 includes a virtual object 1810, an environment picture 1830, a viewing angle switching region 1820, and a virtual left joystick 1840. The environment picture 1830 in the first user interface 1800 is an environment picture of a three-dimensional virtual environment observed from a first viewing angle direction by the virtual object 1810. The environment picture includes a hill 1831 that is relatively far away from the virtual object 1810, and a factory 1832, the earth 1834, the sky 1835, and the horizon 1833 that are relatively close to the virtual object 1810. The viewing angle switching region 1820 is overlapped on the environment picture 1830 for displaying and is a long-strip shaped region located at a right edge of the environment picture 1830. A reference viewing angle jumping element is a central region located in the viewing angle switching region 1820, a slider 1821 is displayed in the viewing angle switching region 1820, and the user may press the slider 1821 to slide the slider to a region in which a target viewing angle jumping element is located.

Step 1602: Receive a viewing angle jumping signal triggered on a target viewing angle jumping element.

The terminal receives a viewing angle jumping signal triggered on a target viewing angle jumping element, and the viewing angle jumping signal is a signal generated when the user slides the target viewing angle jumping element, where the target viewing angle jumping element is one of the at least one viewing angle jumping element.

For example, as shown in FIG. 17, the user taps the slider 1721 in the viewing angle switching region 1720 to slide the slider from a reference jumping element located in the central region to a region in which a target viewing angle jumping element is located. A viewing angle jumping signal is triggered when the user taps the slider 1721, and viewing angle jumping signals are continuously generated along with the user sliding the slider 1721 until the user slides the slider 1721 to stop at a target jumping region.

For example, as shown in FIG. 18, the user taps the slider 1821 in the viewing angle switching region 1820 to slide the slider from a reference jumping element located in the central region to a region in which a target viewing angle jumping element is located. A viewing angle jumping signal is triggered when the user taps the slider 1821, and viewing angle jumping signals are continuously generated along with the user sliding the slider 1821 until the user slides the slider 1821 to stop at a target jumping region.

Step 1603: Determine an offset value and an offset direction between the target viewing angle jumping element and a reference viewing angle jumping element.

The terminal determines an offset value and an offset direction between the target viewing angle jumping element and a reference viewing angle jumping element. Optionally, the reference viewing angle jumping element is a viewing angle jumping element of the central region of the viewing angle switching region, and the terminal may calculate an offset value according to coordinates of the target viewing angle jumping element and coordinates of the reference viewing angle jumping element, to obtain an offset direction.

For example, as shown in FIG. 17, the terminal calculates a distance D1 between the reference viewing angle jumping element and the target viewing angle jumping element according to coordinates of a reference point of the target viewing angle jumping element and coordinates of a reference point of the reference viewing angle jumping element, to obtain an offset value D1, and the offset direction is a direction corresponding to the target viewing angle jumping element, where the reference point of the reference viewing angle jumping element may be a central point of the reference viewing angle jumping element, and the reference point of the target viewing angle jumping element may be a central point of the target viewing angle jumping element.

For example, as shown in FIG. 18, the terminal calculates a distance D2 between the reference viewing angle jumping element and the target viewing angle jumping element according to coordinates of a reference point of the target viewing angle jumping element and coordinates of a reference point of the reference viewing angle jumping element, to obtain an offset value D2, and the offset direction is a direction corresponding to the target viewing angle jumping element, where the reference point of the reference viewing angle jumping element may be a central point of the reference viewing angle jumping element, and the reference point of the target viewing angle jumping element may be a central point of the target viewing angle jumping element.

Step 1604: Determine an offset angle of a first viewing angle direction according to the offset value and the offset direction.

The terminal determines an offset angle of a first viewing angle direction according to the offset value and the offset direction between the target viewing angle jumping element and the reference viewing angle jumping element.

For example, as shown in FIG. 17, the viewing angle switching region 1720 adopts a long-strip shaped region to correspond to all viewing angle directions among the 360-degree horizontal viewing angle directions centered on a located in which the virtual object is located. However, during displaying, only some viewing angle directions are displayed. For example, if the north direction is 0 degrees, when a viewing angle direction of the virtual object 1710 is the north direction, viewing angle directions displayed in the viewing angle switching region 1720 are from 300 degrees to 0 degrees and 0 degrees to 90 degrees, and if the reference point of the target viewing angle jumping element is between 0 degrees to 90 degrees and a length of the viewing angle switching region 1720 is L1, the offset angle is 90*1/2*D1/L1.

For example, as shown in FIG. 18, the viewing angle switching region 1820 adopts a long-strip shaped region to correspond to all viewing angle directions from a first looking up direction to a second looking down direction centered on a location in which the virtual object is located, where a vertically upward direction is the first looking up direction and an angle corresponding to the direction is 90 degrees, and a vertically downward direction is the second looking down direction and an angle corresponding to the direction is −90 degrees. However, during displaying, only some viewing angle directions are displayed. For example, if a direction at eye level is 0 degrees, when a viewing angle direction of the virtual object 1810 is the direction at eye level, viewing angle directions displayed in the viewing angle switching region 1820 are from −45 degrees to 45 degrees, and if the reference point of the target viewing angle jumping element is between 0 degrees to 45 degrees and a length of the viewing angle switching region 1820 is L2, the offset angle is 90*1/2*D2/L2.

Step 1605: Obtain a second viewing angle direction after offsetting the first viewing angle direction according to the offset angle.

The terminal rotates the first viewing angle direction toward the offset direction by the offset angle, to obtain a second viewing angle direction.

Step 1606: Display a second user interface.

After obtaining the second viewing angle direction, the terminal displays a second user interface. The second user interface includes an environment picture of the three-dimensional virtual environment observed from the second viewing angle direction by the virtual object.

For example, as shown in FIG. 17, after determining the second viewing angle direction, the terminal displays a second user interface 1750. The second user interface 1750 includes an environment picture 1760 of the three-dimensional virtual environment observed from the second viewing angle direction by the virtual object 1710, where the environment picture 1730 includes a factory 1732 located in front of the virtual object 1710, and a hill 1731, the sky 1735, the earth 1734, and the horizon 1733 that are located in a bit west of the front of the virtual object 1710.

For example, as shown in FIG. 18, after determining the second viewing angle direction, the terminal displays a second user interface 1850. The second user interface 1850 includes an environment picture 1860 of the three-dimensional virtual environment observed from the second viewing angle direction by the virtual object 1810, where the environment picture 1860 includes a factory 1832 located in front of and relatively far away from the virtual object 1810, and a hill 1831, the sky 1835, the earth 1834, and the horizon 1833 that are located in front of and relatively close to the virtual object 1810.

Based on the above, in this embodiment, by receiving the viewing angle jumping signal triggered on the target viewing angle jumping element in the viewing angle switching region, and displaying the second user interface according to the second viewing angle direction corresponding to the target viewing angle jumping element, the problem of low efficiency of human-computer interaction when a viewing angle direction of a virtual object is changed by using a right sliding screen in the related art is resolved. Because the viewing angle direction of the virtual object is changed by tapping a target viewing angle jumping element instead of using the right sliding screen, the switching speed of the viewing angle is increased, so as to improve the efficiency of human-computer interaction.

Further, in this embodiment, by determining an offset value and an offset direction between the target viewing angle jumping element and the reference viewing angle jumping element, the offset angle of the first viewing angle direction is determined according to the offset value and the offset direction, to further obtain a second viewing angle direction after offsetting the first viewing angle direction according to the offset angle, which improves the accuracy of calculating the second viewing angle direction.

Figure 19:
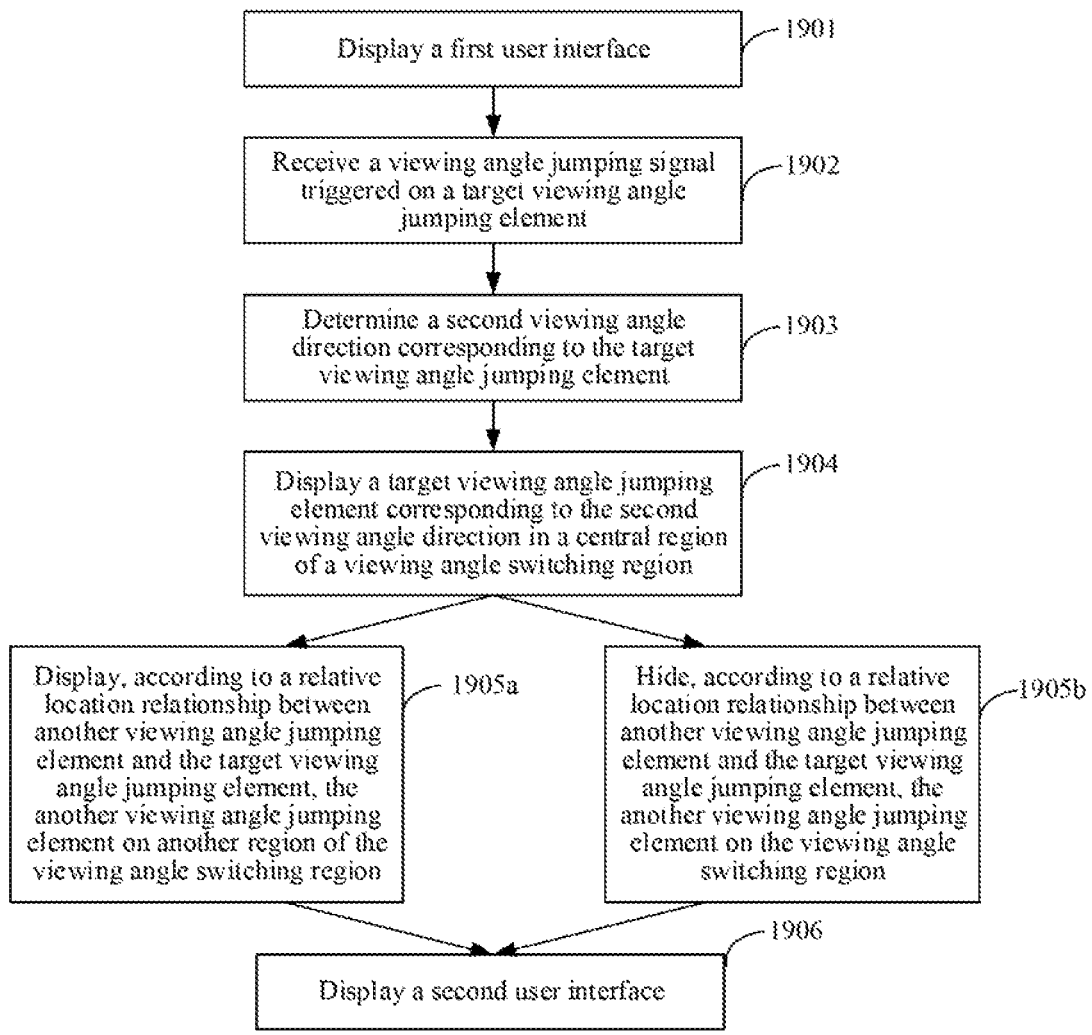
FIG. 19 is a flowchart of a viewing angle switching method for a virtual environment according to an exemplary embodiment.

The jumping elements displayed by the viewing angle switching region may include all viewing angle directions of the virtual object, or may include some viewing angle directions of the virtual object, and the jumping elements displayed by the viewing angle switching region may be implemented by the embodiment of FIG. 19.

FIG. 19 shows a flowchart of a viewing angle switching method for a virtual environment according to an exemplary embodiment. The method may be applied to the terminals in the embodiments of FIG. 8 and FIG. 9 or applied to the server in the embodiment of FIG. 9. In this embodiment, description is made by using an example in which the method is applied to a terminal, and the method includes the following steps:

Step 1901: Display a first user interface.

A terminal displays a first user interface, the first user interface including an environment picture of a three-dimensional virtual environment observed from a first viewing angle direction by a virtual object and a viewing angle switching region, and the viewing angle switching region including at least one viewing angle jumping element used for performing viewing angle jumping, where the viewing angle jumping element is an element control in the viewing angle switching region.

Step 1902: Receive a viewing angle jumping signal triggered on a target viewing angle jumping element.

The terminal receives a viewing angle jumping signal triggered on a target viewing angle jumping element, and the viewing angle jumping signal is a signal generated when the user taps and/or slides the target viewing angle jumping element, where the target viewing angle jumping element is one of the at least one viewing angle jumping element.

Step 1903: Determine a second viewing angle direction corresponding to the target viewing angle jumping element.

The terminal determines a second viewing angle direction corresponding to the target viewing angle jumping element according to the viewing angle jumping signal.

Optionally, the terminal determines a second viewing angle direction corresponding to the target viewing angle jumping element according to the methods in the embodiments of FIG. 15 and FIG. 16.

Step 1904: Display a target viewing angle jumping element corresponding to the second viewing angle direction in a central region of a viewing angle switching region.

After determining the second viewing angle direction, the terminal changes a display location of the viewing angle jumping element in the viewing angle switching region according to the second viewing angle direction, and displays a target viewing angle jumping element corresponding to the second viewing angle direction in a central region of the viewing angle switching region. After step 1904 is performed, the terminal may perform step 1905*a* or step 1905*b*. Generally, step 1905*a* and step 1905*b* cannot be implemented simultaneously. However, when the user display interface displays two viewing angle switching regions, the terminal may perform step 1905*a* and step 1905*b* successively, and the execution sequence is not limited.

For example, as shown in FIG. 11, when the terminal determines that the second viewing angle direction is 30 degrees north by east, a target viewing angle jumping element, for example, a 30-degree scale, corresponding to the second viewing angle direction is displayed in a central region of the viewing angle switching region 1120.

For example, as shown in FIG. 12, when the terminal determines that the second viewing angle direction is 0 degrees at eye level, a target viewing angle jumping element, for example, a 0-degree scale, corresponding to the second viewing angle direction is displayed in a central region of the viewing angle switching region 1220.

For example, as shown in FIG. 13, when the terminal determines that the second viewing angle direction is 30 degrees north by east, a target viewing angle jumping element, for example, the first subregion 6, corresponding to the second viewing angle direction is displayed in a central region of the viewing angle switching region 1320.

For example, as shown in FIG. 14, when the terminal determines that the second viewing angle direction is 0 degrees at eye level, a target viewing angle jumping element, for example, the second subregion 4, corresponding to the second viewing angle direction is displayed in a central region of the viewing angle switching region 1420.

Step 1905*a*: Display, according to a relative location relationship between another viewing angle jumping element and the target viewing angle jumping element, the another viewing angle jumping element on another region of the viewing angle switching region.

The terminal displays, according to a relative location relationship between another viewing angle jumping element and the target viewing angle jumping element in the viewing angle switching region, the another viewing angle jumping element on another region of the viewing angle switching region.

For example, as shown in FIG. 13, a first subregion 1 to a first subregion 7 displayed in the viewing angle switching region 1320 respectively correspond to all viewing angle directions among the 360-degree horizontal viewing angle directions centered on a location in which the virtual object is located. Before the viewing angle switching, the viewing angle direction is a direction corresponding to the first subregion 4, and after the viewing angle switching, the viewing angle direction is a direction corresponding to the first subregion 6. After the viewing angle switching, the first subregion 6 is displayed in the central region of the viewing angle switching region 1320, and the first subregion 1 and a first subregion 2 that are originally located at a left edge of the viewing angle switching region are now displayed at a right edge of the viewing angle switching region.

For example, as shown in FIG. 14, a second subregion 1 to a second subregion 7 displayed in the viewing angle switching region 1420 are respectively all viewing angle directions from a first looking up direction to a second looking down direction of the virtual object. Before the viewing angle switching, the viewing angle direction is a direction corresponding to a second subregion 6, and after the viewing angle switching, the viewing angle direction is a direction corresponding to a second subregion 4. After the viewing angle switching, the second subregion 4 is displayed in the central region of the viewing angle switching region 1420, and a second subregion 3 and the second subregion 4 that are originally located at a left edge of the viewing angle switching region are now displayed at a right edge of the viewing angle switching region.

Step 1905*b*: Hide, according to a relative location relationship between another viewing angle jumping element and the target viewing angle jumping element, the another viewing angle jumping element on the viewing angle switching region.

The terminal hides, according to a relative location relationship between another viewing angle jumping element and the target viewing angle jumping element in the viewing angle switching region, the another viewing angle jumping element on another region of the viewing angle switching region.

For example, as shown in FIG. 17, scales in the viewing angle switching region 1720 respectively correspond to all viewing angle directions among the 360-degree horizontal viewing angle directions centered on a location in which the virtual object is located. However, only some viewing angle directions, for example, viewing angle directions among 90 degrees centered on a location in which the virtual object is located, are displayed. Before the viewing angle switching, the viewing angle direction is a direction corresponding to a 0-degree scale, and after the viewing angle switching, the viewing angle direction is a direction corresponding to a 30-degree scale. After the viewing angle switching, the 30-degree scale is displayed in the central region of the viewing angle switching region 1720, and a northwest scale and a 330-degree scale that are originally located at a left edge of the viewing angle switching region are now hidden.

For example, as shown in FIG. 18, scales in the viewing angle switching region 1820 respectively correspond to all viewing angle directions from a first looking up direction to a second looking down direction of the virtual object.

However, only some viewing angle directions are displayed, for example, only viewing angle directions among 90 degrees from the first looking up direction to the second looking down direction of the virtual object are displayed. Before the viewing angle switching, the viewing angle direction is a direction corresponding to a −45-degree scale, and after the viewing angle switching, the viewing angle direction is a direction corresponding to a 0-degree scale. After the viewing angle switching, the 0-degree scale is displayed in the central region of the viewing angle switching region 1820, and a −60-degree scale, a −75-degree scale, and a −90-degree scale that are originally located at a lower edge of the viewing angle switching region are now hidden.

Step 1906: Display a second user interface.

After obtaining the second viewing angle direction, the terminal displays a second user interface. The second user interface includes an environment picture of the three-dimensional virtual environment observed from the second viewing angle direction by the virtual object and a viewing angle switching region overlapped on the environment picture, where the viewing angle jumping element is displayed in a central region of the viewing angle switching region.

Based on the above, in this embodiment, by receiving the viewing angle jumping signal triggered on the target viewing angle jumping element in the viewing angle switching region, and displaying the second user interface according to the second viewing angle direction corresponding to the target viewing angle jumping element, the problem of low efficiency of human-computer interaction when a viewing angle direction of a virtual object is changed by using a right sliding screen in the related art is resolved. Because the viewing angle direction of the virtual object is changed by tapping the target viewing angle jumping element instead of using the right sliding screen, the switching speed of the viewing angle is increased, so as to improve the efficiency of human-computer interaction.

Further, in this embodiment, by displaying the target viewing angle jumping element in the central region of the viewing angle switching region, the second user interface can clearly reflect the second viewing angle direction corresponding to the virtual object, which improves the convenience of viewing angle switching.

Figure 20:
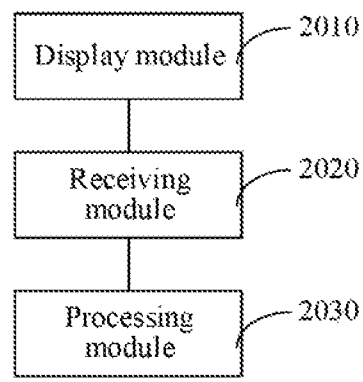
FIG. 20 is a structural block diagram of a viewing angle switching apparatus according to an exemplary embodiment.

FIG. 20 shows a structural block diagram of a viewing angle switching apparatus according to an exemplary embodiment. The apparatus is configured to implement viewing angle switching on a virtual environment, and the apparatus may be applied to the terminals in the embodiments of FIG. 8 and FIG. 9 or the server in the embodiment of FIG. 9. The apparatus includes a display module 2010, a receiving module 2020, and a processing module 2030.

The display module 2010 is configured to display a first user interface, the first user interface including an environment picture of a virtual environment observed from a first viewing angle direction by a virtual object and a viewing angle switching region, and the viewing angle switching region including at least one viewing angle jumping element used for performing viewing angle jumping.

The receiving module 2020 is configured to receive a viewing angle jumping signal triggered on a target viewing angle jumping element, the target viewing angle jumping element being one of the at least one viewing angle jumping element.

The processing module 2030 is configured to determine a second viewing angle direction corresponding to the target viewing angle jumping element.

The display module 2010 is further configured to display a second user interface. The second user interface includes an environment picture of the virtual environment observed from the second viewing angle direction by the virtual object.

In an optional embodiment, the viewing angle jumping element includes a jumping element represented by using a first direction scale, and the first direction scale is used for representing all viewing angle directions or some viewing angle directions among 360-degree horizontal viewing angle directions centered on a location in which the virtual object is located.

In an optional embodiment, the viewing angle jumping element includes a jumping element represented by using a second direction scale, and the second direction scale is used for representing all viewing angle directions or some viewing angle directions from a first looking up direction to a second looking down direction of the virtual object.

In an optional embodiment, the viewing angle jumping element includes a jumping element represented by using first subregions, and each of the first subregions is used for representing one viewing angle direction among 360-degree horizontal viewing angle directions centered on a location in which the virtual object is located.

In an optional embodiment, the viewing angle jumping element includes a jumping element represented by using second subregions, and each of the second subregions is used for representing one viewing angle direction from a first looking up direction to a second looking down direction of the virtual object.

In an optional embodiment, the viewing angle switching region is overlapped on the environment picture for displaying.

In an optional embodiment, the viewing angle switching region is a long-strip shaped region located at a predetermined edge of the environment picture, and the predetermined edge includes at least one of a top edge, a bottom edge, a left edge, and a right edge.

In another optional embodiment, the processing module 2030 is further configured to query a preset correspondence for a second viewing angle direction corresponding to the target viewing angle jumping element, where the preset correspondence stores a viewing angle direction respectively corresponding to the at least one viewing angle jumping element.

In another optional embodiment, the processing module 2030 is further configured to determine an offset value and an offset direction between the target viewing angle jumping element and a reference viewing angle jumping element, the reference viewing angle jumping element being a viewing angle jumping element corresponding to the first viewing angle direction; determine an offset angle of the first viewing angle direction according to the offset value and the offset direction; and obtain the second viewing angle direction after offsetting the first viewing angle direction according to the offset angle.

In another optional embodiment, the display module 2010 is further configured to change a display location of the viewing angle jumping element in the viewing angle switching region according to the second viewing angle direction.

In an optional embodiment, the viewing angle jumping element includes a jumping element represented by using a first direction scale.

The display module 2010 is further configured to display the target viewing angle jumping element corresponding to the second viewing angle direction in a central region of the viewing angle switching region; and display, according to a relative location relationship between another viewing angle jumping element and the target viewing angle jumping element, the another viewing angle jumping element on another region of the viewing angle switching region; or hide, according to a relative location relationship between another viewing angle jumping element and the target viewing angle jumping element, the another viewing angle jumping element on the viewing angle switching region.

In an optional embodiment, the viewing angle switching region includes a first scale bar represented by using the first direction scale and a slider located on the first scale bar. The viewing angle jumping signal is a signal for moving the slider on the first scale bar, and the second viewing angle direction is a viewing angle direction corresponding to a scale indicated by the moved slider on the first scale bar, where the first direction scale is used for representing all viewing angle directions or some viewing angle directions among 360-degree horizontal viewing angle directions centered on a location in which the virtual object is located.

In an optional embodiment, the viewing angle switching region includes a second scale bar represented by using the second direction scale and a slider located on the second scale bar. The viewing angle jumping signal is a signal for moving the slider on the second scale bar, and the second viewing angle direction is a viewing angle direction corresponding to a scale indicated by the moved slider on the second scale bar, where the second direction scale is used for representing all viewing angle directions or some viewing angle directions from a first looking up direction to a second looking down direction of the virtual object.

Figure 21:
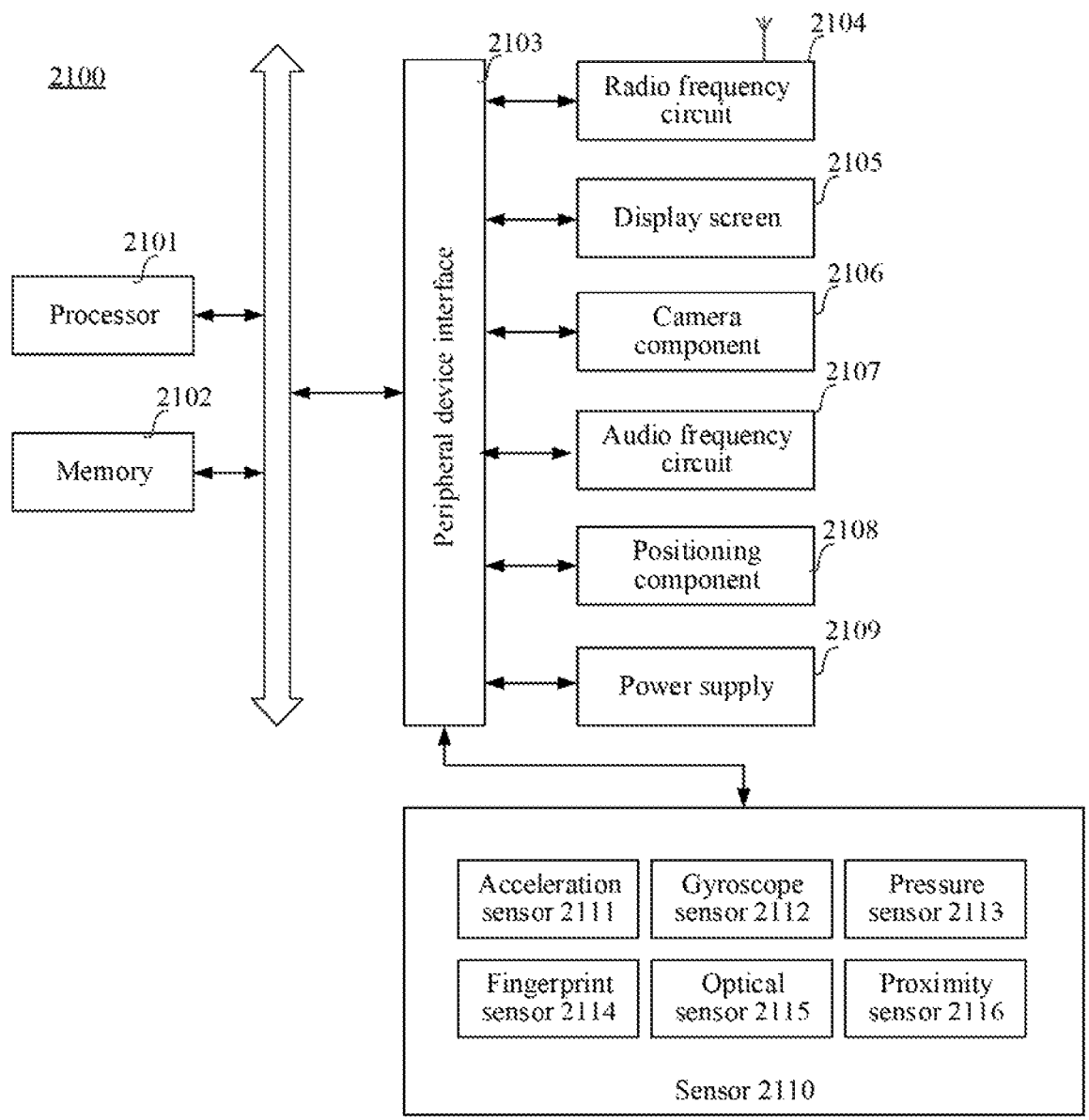
FIG. 21 is a structural block diagram of an electronic device according to an exemplary embodiment.

FIG. 21 is a structural block diagram of an electronic device 2100 according to an exemplary embodiment. The device is configured to implement viewing angle switching on a virtual environment. The electronic device 2100 may be a smartphone, a tablet computer, an MP3 player, an MP4 player, a notebook computer, or a desktop computer. The electronic device 2100 may also be referred to as another name such as a terminal, user equipment, a portable terminal, a laptop terminal, or a desktop terminal.

Generally, the electronic device 2100 includes a processor 2101 and a memory 2102.

The processor 2101 may include one or more processing cores, for example, a 4-core processor or an 8-core processor. The processor 2101 may be implemented by at least one hardware form of a digital signal processor (DSP), a field-programmable gate array (FPGA), and a programmable logic array (PLA). The processor 2101 may alternatively include a main processor and a coprocessor. The main processor is configured to process data in an awake state, also referred to as a central processing unit (CPU), and the coprocessor is a low-power processor configured to process data in an idle state. In some embodiments, the processor 2101 may be integrated with a graphics processing unit (GPU). The GPU is responsible for rendering and drawing content to be displayed by a display screen. In some embodiments, the processor 2101 may further include an artificial intelligence (AI) processor. The AI processor is configured to process a calculation operation related to machine learning.

The memory 2102 may include one or more computer-readable storage media. The computer-readable storage media may be non-transient. The memory 2102 may further include a high-speed random access memory, and a non-volatile memory such as one or more magnetic disk storage devices and a flash memory device. In some embodiments, the non-transient computer-readable storage medium in the memory 2102 is configured to store at least one instruction. The at least one instruction is executed by the processor 2101 to perform the viewing angle switching method for a three-dimensional virtual environment provided in the method embodiment.

In some embodiments, the electronic device 2100 may further optionally include a peripheral device interface 2103 and at least one peripheral device. The processor 2101, the memory 2102, and the peripheral device interface 2103 may be connected through a bus or a signal cable. Each peripheral device may be connected to the peripheral device interface 2103 through a bus, a signal cable, or a circuit board. Specifically, the peripheral device includes: at least one of a radio frequency (RF) circuit 2104, a touch display screen 2105, a camera component 2106, an audio frequency circuit 2107, a positioning component 2108, and a power supply 2109.

The peripheral device interface 2103 may be configured to connect at least one peripheral device related to input/output (I/O) to the processor 2101 and the memory 2102. In some embodiments, the processor 2101, the memory 2102, and the peripheral device interface 2103 are integrated into the same chip or circuit board. In some other embodiments, any one or two of the processor 2101, the memory 2102, and the peripheral device interface 2103 may be implemented on an independent chip or circuit board, and the implementation is not limited in this embodiment.

The RF circuit 2104 is configured to receive and transmit a RF signal, also referred to as an electromagnetic signal. The RF circuit 2104 communicates with a communications network and another communications device by using the electromagnetic signal. The RF circuit 2104 may convert an electric signal into an electromagnetic signal for transmission, or convert a received electromagnetic signal into an electric signal. Optionally, the RF circuit 2104 includes an antenna system, an RF transceiver, one or more amplifiers, a tuner, an oscillator, a digital signal processor, a codec chip set, a subscriber identity module card, and the like. The RF circuit 2104 may communicate with other terminals through at least one wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 2104 may also include a circuit related to near field communication (NFC). This is not limited in this application.

The display screen 2105 is configured to display a user interface (UI). The UI may include a graph, text, an icon, a video, and any combination thereof. In a case that the display screen 2105 is a touch display screen, the display screen 2105 is further capable of collecting a touch signal on or over a surface of the display screen 2105. The touch signal may be inputted into the processor 2101 as a control signal for processing. In this case, the display screen 2105 may be further configured to provide a virtual button and/or a virtual keyboard, also referred to as a soft button and/or a soft keyboard. In some embodiments, there is one display screen 2105, disposed on a front panel of the electronic device 2100. In some other embodiments, there may be two display screens 2105, respectively disposed on different surfaces of the electronic device 2100 or designed in a foldable shape. In still some other embodiments, the display screen 2105 may be a flexible display screen, disposed on a curved surface or a folded surface of the electronic device 2100. Even, the display screen 2105 may be further set to have a non-rectangular irregular graph, that is, a special-shaped screen. The display screen 2105 may be manufactured by using a material such as a liquid crystal display (LCD), an organic light-emitting diode (OLED), or the like.

The camera component 2106 is configured to collect an image or a video. Optionally, the camera component 2106 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 2106 may further include a flash. The flash may be a single color temperature flash or a double color temperature flash. The double color temperature flash refers to a combination of a warm flash and a cold flash, and may be configured to perform light ray compensation at different color temperatures.

The audio circuit 2107 may include a microphone and a loudspeaker. The loudspeaker is configured to collect sound waves of a user and an environment, and convert the sound waves into electric signals and input the electrical signals into the processor 2101 for processing, or input the electrical signals into the RF circuit 2104 to implement speech communication. For the purpose of stereo sound collection or noise reduction, there may be a plurality of microphones, respectively disposed at different parts of the electronic device 2100. The microphone may be further a microphone array or an omni-directional collection microphone. The loudspeaker is configured to convert electric signals from the processor 2101 or the RF circuit 2104 into sound waves. The loudspeaker may be a conventional thin-film loudspeaker or a piezoelectric ceramic loudspeaker. In a case that the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 2107 may further include an earphone jack.

The positioning component 2108 is configured to position a current geographic location of the electronic device 2100, to implement a navigation or a location based service (LBS). The positioning component 2108 may be a positioning component based on the global positioning system (GPS) of the United States, the Beidou system of China, or the Galileo system of Russia.

The power supply 2109 is configured to supply power to components in the electronic device 2100. The power supply 2109 may be an alternating current, a direct current, a primary battery, or a rechargeable battery. In a case that the power supply 2109 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the electronic device 2100 further includes one or more sensors 2110. The one or more sensors 2110 include, but are not limited to, an acceleration sensor 2111, a gyroscope sensor 2112, a pressure sensor 2113, a fingerprint sensor 2114, an optical sensor 2115, and a proximity sensor 2116.

The acceleration sensor 2111 may detect acceleration on three coordinate axes of a coordinate system established by the electronic device 2100. For example, the acceleration sensor 2111 may be configured to detect components of gravity acceleration on the three coordinate axes. The processor 2101 may control, according to a gravity acceleration signal collected by the acceleration sensor 2111, the display screen 2105 to display the user interface in a frame view or a portrait view. The acceleration sensor 2111 may be further configured to collect motion data of a game or a user.

The gyroscope sensor 2112 may detect a body direction and a rotation angle of the electronic device 2100. The gyroscope sensor 2112 may cooperate with the acceleration sensor 2111 to collect a 3D action by the user on the electronic device 2100. The processor 2101 may implement the following functions according to data collected by the gyroscope sensor 2112: motion sensing (for example, the UI is changed according to a tilt operation of the user), image stabilization during shooting, game control, and inertial navigation.

The pressure sensor 2113 may be disposed on a side frame of the electronic device 2100 and/or a lower layer of the touch display screen 2105. In a case that the pressure sensor 2113 is disposed on the side frame of the electronic device 2100, a holding signal of the user on the electronic device 2100 may be detected. The processor 2101 performs left and right hand recognition or a quick operation according to the holding signal collected by the pressure sensor 2113. When the pressure sensor 2113 is disposed on the low layer of the display screen 2105, the processor 2101 controls an operable control on the UI according to a pressure operation of the user on the display screen 2105. The operable control includes at least one of a button control, a scroll bar control, an icon control, and a menu control.

The fingerprint sensor 2114 is configured to collect a fingerprint of the user. The processor 2101 identifies an identity of the user according to the fingerprint collected by the fingerprint sensor 2114, or the fingerprint sensor 2114 identifies an identity of the user according to the collected fingerprint. In a case that the identity of the user is identified as a trusted identity, the processor 2101 authorizes the user to perform a related sensitive operation. The sensitive operation includes unlocking a screen, viewing encrypted information, downloading software, payment, changing settings, and the like. The fingerprint sensor 2114 may be disposed on a front face, a back face, or a side face of the electronic device 2100. In a case that a physical button or a vendor logo is disposed on the electronic device 2100, the fingerprint sensor 2114 may be integrated together with the physical button or the vendor logo.

The optical sensor 2115 is configured to collect ambient light intensity. In an embodiment, the processor 1501 may control display luminance of the display screen 2105 according to the ambient light intensity collected by the optical sensor 2115. Specifically, when the ambient light intensity is relatively high, the display luminance of the display screen 2105 is increased. When the ambient light intensity is relatively low, the display luminance of the display screen 2105 is reduced. In another embodiment, the processor 2101 may further dynamically adjust shooting parameters of the camera component 2106 according to the ambient light intensity collected by the optical sensor 2115.

The proximity sensor 2116, also referred to as a distance sensor, is generally disposed on the front panel of the electronic device 2100. The proximity sensor 2116 is configured to collect a distance between a front face of the user and the front face of the electronic device 2100. In an embodiment, when the proximity sensor 2116 detects that the distance between the front face of the user and the front face of the electronic device 2100 is gradually decreased, the processor 2101 controls the touch display screen 2105 to switch from a screen-on state to a screen-off state. In a case that the proximity sensor 2116 detects that the distance between the front face of the user and the front face of the electronic device 2100 is gradually increased, the processor 2101 controls the touch display screen 2105 to switch from the screen-off state to the screen-on state.

A person skilled in the art may understand that a structure shown in FIG. 19 constitutes no limitation on the electronic device 1500, and the electronic device may include more or fewer components than those shown in the figure, or some components may be combined, or a different component deployment may be used.

This application further provides a computer-readable storage medium, the storage medium storing at least one instruction, at least one program, and a code set or instruction set, and the at least one instruction, the at least one program, and the code set or instruction set being loaded and executed by a processor to implement the viewing angle switching method for a virtual environment according to the foregoing method embodiment.

This application further provides a computer program product including an instruction, the computer program product, when run on a computer, causing the computer to perform the viewing angle switching method for a virtual environment according to the foregoing various aspects.

It is to be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A viewing angle switching method, performed by at least one processor, for a virtual environment, the viewing angle switching method comprising:
   displaying, by the at least one processor, a first user interface, the first user interface comprising an environment picture, a virtual joystick, and a viewing angle switching region, the environment picture comprising a three-dimensional virtual environment observed from a first viewing angle direction by a virtual object in a first position of the three-dimensional virtual environment, and the viewing angle switching region comprising at least one viewing angle jumping element used for viewing angle jumping, wherein a first viewing angle jumping element of the at least one viewing angle jumping element comprises 360 first subregions horizontally adjacent to each other, and each of the first subregions is selectable and represents one degree of viewing angle direction among 360 degrees of horizontal viewing angle directions centered on a location in which the virtual object is located;
   receiving, by the at least one processor, a viewing angle jumping signal triggered on a target first subregion of the first subregions of the first viewing angle jumping element;
   determining, by the at least one processor, a second viewing angle direction corresponding to the viewing angle jumping signal;
   displaying, by the at least one processor, a second user interface, the second user interface comprising the environment picture of the three-dimensional virtual environment observed from the second viewing angle direction by the virtual object in the first position, the virtual joystick, and the viewing angle switching region, wherein the first subregions displayed in the first user interface are arranged in a first order, and the first subregions displayed in the second user interface are arranged in a second order;
   receiving, by the at least one processor, a virtual object movement signal triggered on the virtual joystick;
   determining, by the at least one processor, a movement direction corresponding to the virtual object movement signal;
   moving, by the at least one processor, the virtual object in the movement direction from the first position to a second position of the three-dimensional virtual environment; and
   displaying, by the at least one processor, a third user interface, the third user interface comprising the environment picture of the three-dimensional virtual environment observed from the second viewing angle direction by the virtual object in the second position, the virtual joystick, and the viewing angle switching region.

2. The viewing angle switching method according to claim 1, wherein the at least one viewing angle jumping element comprises a second jumping element representing viewing angle directions from a first looking up direction to a second looking down direction.

3. The viewing angle switching method according to claim 1, wherein the at least one viewing angle jumping element comprises a second jumping element that comprises second subregions, and each of the second subregions is selectable and represents one viewing angle direction from a first looking up direction to a second looking down direction.

4. The viewing angle switching method according to claim 1, wherein the viewing angle switching region is overlapped on the environment picture.

5. The viewing angle switching method according to claim 1, wherein the viewing angle switching region is a long-strip shaped region disposed along a predetermined edge of the environment picture, and the predetermined edge is selected from among a top edge, a bottom edge, a left edge, and a right edge.

6. The viewing angle switching method according to claim 1, wherein the determining the second viewing angle direction corresponding to the viewing angle jumping signal comprises:
   querying, by the at least one processor, a preset correspondence for the second viewing angle direction corresponding to the target first subregion, wherein the preset correspondence stores a viewing angle direction respectively corresponding to each of the first subregions.

7. The viewing angle switching method according to claim 1, wherein the determining the second viewing angle direction corresponding to the viewing angle jumping signal comprises:
determining, by the at least one processor, an offset value and an offset direction between the target first subregion and a reference subregion, the reference subregion corresponding to the first viewing angle direction;
determining, by the at least one processor, an offset angle of the first viewing angle direction according to the offset value and the offset direction; and
obtaining, by the at least one processor, the second viewing angle direction after offsetting the first viewing angle direction according to the offset angle.

8. The viewing angle switching method according to claim 1, further comprising:
changing, by the at least one processor, a display location of the target first viewing angle jumping element in the viewing angle switching region according to the second viewing angle direction.

9. The viewing angle switching method according to claim 1, wherein the target first subregion is displayed at a center of the first viewing angle jumping element in the second user interface.

10. A viewing angle switching apparatus, configured to perform viewing angle switching on a virtual environment, the viewing angle switching apparatus comprising:
at least one memory configured to store computer program code; and
at least one processor configured to access the at least one memory and operate as instructed by the computer program code, the computer program code including:
display code configured to cause the at least one processor to display a first user interface, the first user interface comprising an environment picture, a virtual joystick, and a viewing angle switching region, the environment picture comprising the virtual environment observed from a first viewing angle direction by a virtual object in a first position of the virtual environment, and the viewing angle switching region comprising at least one viewing angle jumping element used for performing viewing angle jumping, wherein a first viewing angle jumping element of the at least one viewing angle jumping element comprises 360 first subregions horizontally adjacent to each other, and each of the first subregions is selectable and represents one degree of viewing angle direction among 360 degrees of horizontal viewing angle directions centered on a location in which the virtual object is located;
receiving code configured to cause the at least one processor to receive a viewing angle jumping signal triggered on a target first subregion of the first subregions of the first viewing angle jumping element; and
processing code configured to cause the at least one processor to determine a second viewing angle direction corresponding to the viewing angle jumping signal,
wherein the display code is further configured to cause the at least one processor to display a second user interface, the second user interface comprising the environment picture of the virtual environment observed from the second viewing angle direction by the virtual object in the first position, the virtual joystick, and the viewing angle switching region, wherein the first subregions displayed in the first user interface are arranged in a first order, and the first subregions displayed in the second user interface are arranged in a second order,
wherein the receiving code is further configured to cause the at least one processor to receive a virtual object movement signal triggered on the virtual joystick,
wherein the processing code is further configured to cause the at least one processor to determine a movement direction corresponding to the virtual object movement signal and move the virtual object in the movement direction from the first position to a second position of the virtual environment, and
wherein the display code is further configured to cause the at least one processor to display a third user interface, the third user interface comprising the environment picture of the virtual environment observed from the second viewing angle direction by the virtual object in the second position, the virtual joystick, and the viewing angle switching region.

11. The viewing angle switching apparatus according to claim 10, wherein the at least one viewing angle jumping element comprises a second jumping element representing viewing angle directions from a first looking up direction to a second looking down direction.

12. The viewing angle switching apparatus according to claim 10, wherein the at least one viewing angle jumping element comprises a second jumping element that comprises second subregions, and each of the second subregions is selectable and represents one viewing angle direction from a first looking up direction to a second looking down direction.

13. The viewing angle switching apparatus according to claim 10, wherein the viewing angle switching region is overlapped on the environment picture.

14. The viewing angle switching apparatus according to claim 10, wherein the viewing angle switching region is a long-strip shaped region disposed along a predetermined edge of the environment picture, and the predetermined edge is selected from among a top edge, a bottom edge, a left edge, and a right edge.

15. The viewing angle switching apparatus according to claim 10, wherein the processing code is further configured to cause the at least one processor to query a preset correspondence for the second viewing angle direction corresponding to the target first subregion, wherein the preset correspondence stores a viewing angle direction respectively corresponding to each of the first subregions.

16. The viewing angle switching apparatus according to claim 10, wherein the processing code is further configured to cause the at least one processor to determine an offset value and an offset direction between the target first subregion and a reference subregion, the reference subregion corresponding to the first viewing angle direction; determine an offset angle of the first viewing angle direction according to the offset value and the offset direction; and obtain the second viewing angle direction after offsetting the first viewing angle direction according to the offset angle.

17. One or more non-transitory computer-readable storage mediums storing computer readable instructions, the computer readable instructions, when executed by one or more processors, cause the one or more processors to:
- display a first user interface, the first user interface comprising an environment picture, a virtual joystick, and a viewing angle switching region, the environment picture comprising a three-dimensional virtual environment observed from a first viewing angle direction by a virtual object in a first position of the three-dimensional virtual environment, and the viewing angle switching region comprising at least one viewing angle jumping element used for viewing angle jumping, wherein a first viewing angle jumping element of the at least one viewing angle jumping element comprises 360 first subregions horizontally adjacent to each other, and each of the first subregions is selectable and represents one degree of viewing angle direction among 360 degrees of horizontal viewing angle directions centered on a location in which the virtual object is located;
- receive a viewing angle jumping signal triggered on a target first subregion of the first subregions of the first viewing angle jumping element;
- determine a second viewing angle direction corresponding to the viewing angle jumping signal;
- display a second user interface, the second user interface comprising the environment picture of the three-dimensional virtual environment observed from the second viewing angle direction by the virtual object in the first position, the virtual joystick, and the viewing angle switching region, wherein the first subregions displayed in the first user interface are arranged in a first order, and the first subregions displayed in the second user interface are arranged in a second order;
- receive a virtual object movement signal triggered on the virtual joystick;
- determine a movement direction corresponding to the virtual object movement signal;
- move the virtual object in the movement direction from the first position to a second position of the three-dimensional virtual environment; and
- display a third user interface, the third user interface comprising the environment picture of the three-dimensional virtual environment observed from the second viewing angle direction by the virtual object in the second position, the virtual joystick, and the viewing angle switching region.

* * * * *